(12) United States Patent
Yamamichi et al.

(10) Patent No.: US 6,295,172 B1
(45) Date of Patent: Sep. 25, 2001

(54) MOLDING APPARATUS, OPTICAL ELEMENT MOLDING METHOD, AND OPTICAL ELEMENT AND PRISM AS MOLDED PRODUCTS

(75) Inventors: Nobuhiro Yamamichi, Yokohama; Nobuyuki Nakagawa, Kawasaki; Kosei Matsumoto, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/366,538

(22) Filed: Aug. 4, 1999

(30) Foreign Application Priority Data

Aug. 24, 1998 (JP) .................................................. 10-237327
Jul. 26, 1999 (JP) .................................................. 11-210775

(51) Int. Cl.[7] ............................. G02B 7/02; C03B 11/08; C03B 23/22
(52) U.S. Cl. .................................... 359/819; 65/37; 65/39
(58) Field of Search .................................... 359/819, 820; 65/37, 39

(56) References Cited

U.S. PATENT DOCUMENTS

| 4,842,633 | * | 6/1989 | Kuribayashi et al. | 65/44 |
| 5,173,100 | * | 12/1992 | Shigyo et al. | 65/102 |
| 5,191,479 | * | 3/1993 | Tsuchida | 359/742 |

FOREIGN PATENT DOCUMENTS

| 0 316 040 | 5/1989 | (EP) . |
| 60-171233 | 9/1985 | (JP) . |
| 63-10100 | 1/1986 | (JP) . |
| 63-297233 | * | 12/1988 | (JP) . |
| 1-145341 | * | 6/1989 | (JP) . |
| 2-157130 | * | 6/1989 | (JP) . |

* cited by examiner

Primary Examiner—Ricky Mack
(74) Attorney, Agent, or Firm—Fitzpatrick, Cella, Harper & Scinto

(57) ABSTRACT

It is an object of this invention to provide a molding apparatus capable of obtaining an optical element of which both an optical functional surface and a lens mounting reference can be molded simultaneously and which has an appropriate lens thickness. In order to achieve this object, the apparatus includes a lower mold having one molding surface on its upper surface, a lower periphery regulating member for fitting on an outer surface of the lower mold to regulate an excess of a glass material swelling outward from the molding surface of the lower mold, an upper mold having the other molding surface on its lower surface, and an upper periphery regulating member for fitting on an outer surface of the upper mold to regulate the excess of the glass material swelling outward from the molding surface of the upper mold. When at least one of the upper and lower molds is moved vertically to press-mold the thermally softened glass material with the molding surfaces, the excess of the glass material flows into a space formed by upper and lower ends of the lower and upper periphery regulating members, respectively. Positions of the upper and lower ends of the space where the excess of the glass material flows into change vertically along edges of the molding surfaces.

2 Claims, 38 Drawing Sheets

F I G. 20
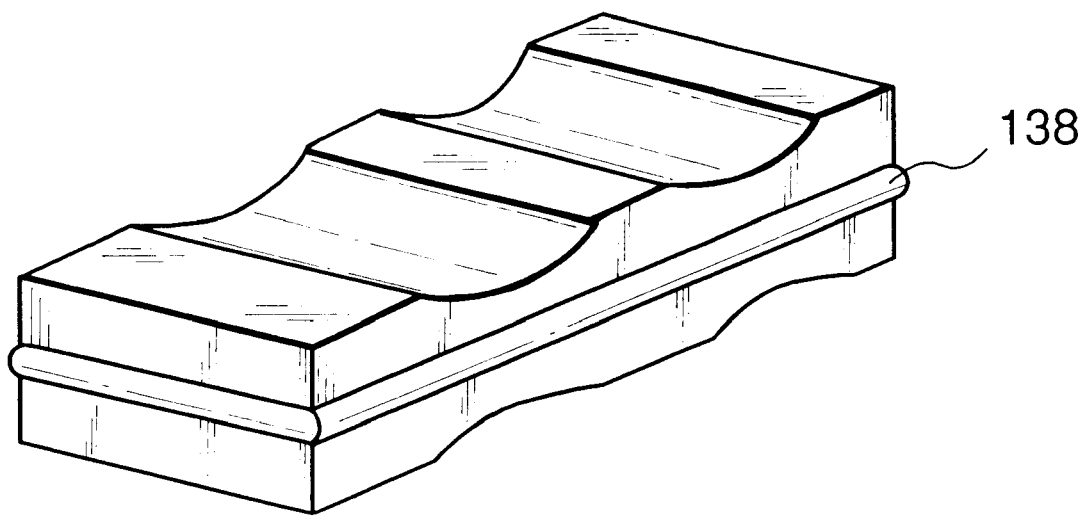

140 — 141

F I G. 30
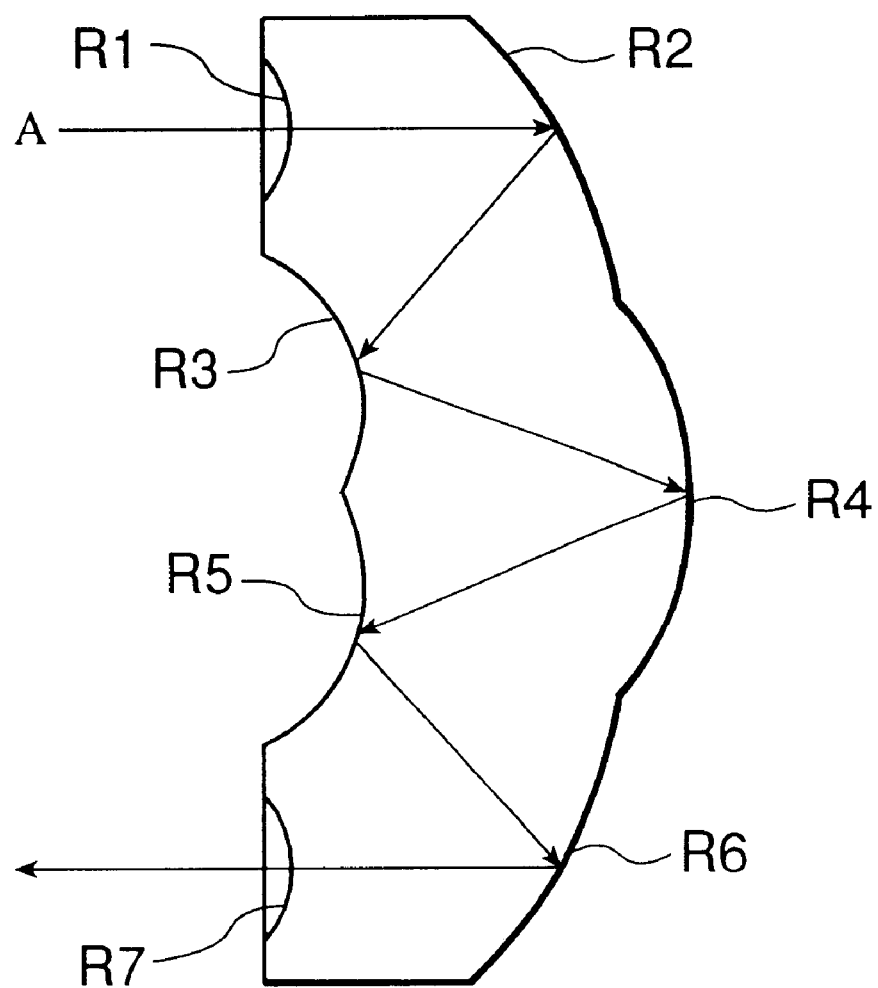

F I G. 35
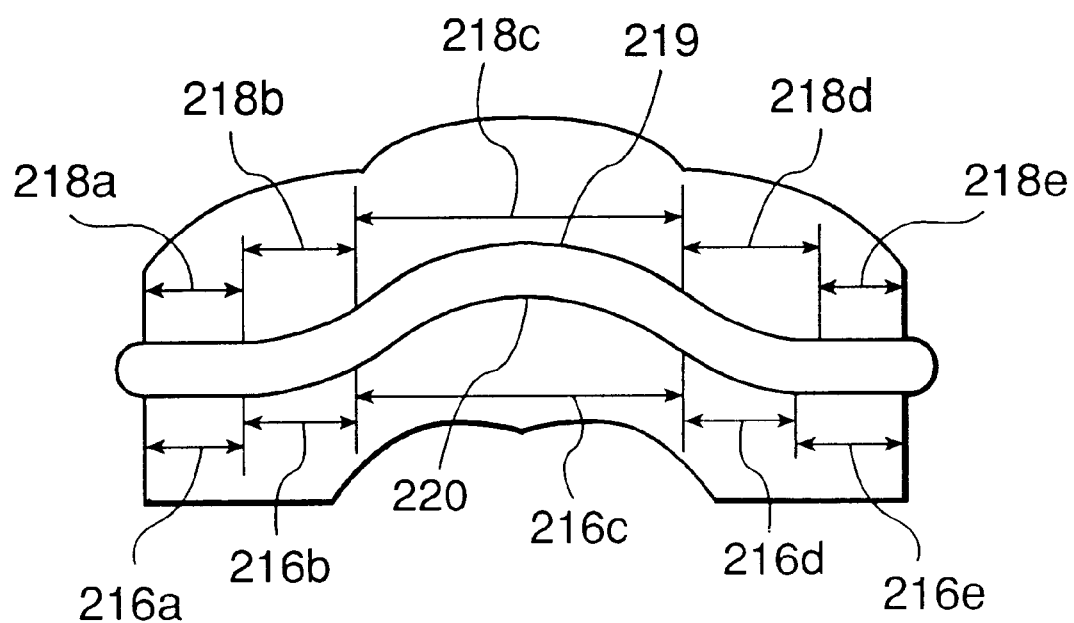

MOLDING APPARATUS, OPTICAL ELEMENT MOLDING METHOD, AND OPTICAL ELEMENT AND PRISM AS MOLDED PRODUCTS

BACKGROUND OF THE INVENTION

The present invention relates to a molding apparatus for molding an optical element such as a glass-molded lens from a thermally softened glass material by pressing a mold, an optical element molding method, and an optical element and prism as molded products.

Conventionally, to obtain a glass-molded lens, a molding apparatus, the main section of which is shown in FIG. 1, is used. In FIG. 1, a glass gob 1 having a predetermined weight is placed between lower and upper molds 2 and 3 slidably arranged in a cylindrical mold 4, and is softened by heating. The lower and upper molds 2 and 3 are made relatively come close to each other to press-mold the glass gob 1, thereby obtaining a required optical glass element such as a glass-molded lens.

With the molding apparatus having this mold structure, the cavity formed in the cylindrical mold 4 is a closed space partitioned by the molding surfaces of the lower and upper molds 2 and 3. When the glass-molded lens is obtained by this apparatus, variations in weight of the glass gob directly appear as variations in thickness of the lens to adversely affect the optical characteristics of the lens.

In order to eliminate the influence cased by the variations in weight of the glass gob, a countermeasure for this is proposed. As shown in FIG. 2, when press molding is performed with upper and lower molds 7 and 6 so as not to regulate the periphery of the glass material with the inner surface of a cylindrical mold 8, an excess 5 of the glass gob is allowed to swell from the edges of the molding surfaces and is received in a recess formed in the inner surface of the cylindrical mold 8.

When the recess is formed in this manner such that the entire periphery of the side surface of the lens to be molded forms an equal swell-out portion, the swell-out portion must be additionally formed with a portion that serves as a reference when incorporating the molded lens in a predetermined holding frame.

In order to avoid this additional formation, a molding apparatus shown in, e.g., Japanese Patent Laid-Open No. 60-171233 is employed. In this apparatus, as shown in FIGS. 3 and 4, slide cores 10L and 10R that slide laterally are molded at portions that form the side surface of the lens, and are moved forward/backward by actuators 11L and 11R. Spaces 9 into which the excess of the glass gob can flow are formed at required portions of the slide cores 10L and 10R. Hence, the lens can be molded with positional references, in addition to the glass swell-out portion, in the horizontal direction simultaneously with formation of optical functional surfaces.

In order to form the lens surfaces and the lens positioning references simultaneously, Japanese Patent Publication No. 63-10100 has already proposed a molding apparatus necessary for this. As shown in FIG. 5, a side surface regulating portion 17 is formed only on the inner surface of a cylindrical mold 16 which does not positionally regulate swelling from the edge of the molding surface of an upper mold 15 but is in contact with the edge of the molding surface of a lower mold 14 corresponding to the optical functional surface of the lens. Alternatively, as shown in FIG. 8, upper and lower upper position regulating members 24 and 23 that form position regulating portions 28 and 27 are formed on the edges of the molding surfaces of upper and lower molds 22 and 21 in a cylindrical mold 25. The molding apparatus has both a portion that regulates circumferential swelling of the softened glass gob from the edges of the upper and lower molds, and a portion 18 (see FIG. 5) or 26 (see FIG. 8) that does not regulate the softened glass gob but allows it to swell out.

A molded optical element as the target of the proposed molding apparatus is axially symmetrical. The amount of excessive glass swelling out from the edges of the molding surfaces of the upper and lower molds when performing press molding can be automatically set constant highly precisely if the gap between the edges of the molding surfaces is kept constant.

In the molding apparatus of Japanese Patent Laid-Open No. 60-171233, the actuators 11L and 11R for driving the slide cores 10L and 10R are needed, leading to a complicated structure. In the molding apparatus of Japanese Patent Publication No. 63-10100, these actuators are not needed and both the glass regulating portion and portion that allows swelling can be provided. In the latter apparatus, as shown in FIGS. 6 and 7, and 9 and 10, regarding its mold structure, a positional reference 19, or positional references 30 and 31 are formed on the outer surface of the molded optical element. Simultaneously, a continuous annular swell-out portion 20 or 29 is formed to surround the outer surface of the molded optical element. Conventionally, most optical elements molded by glass molding are axially symmetrical. Even if the swell-out portion 20 or 29 annularly surrounds the side surface of the lens at a certain constant height, no particular problem arises.

In recent years, as the types and variations of optical elements increase, a demand for axially asymmetrical lenses increases. Assume that, as shown in FIG. 13, an axially asymmetrical optical element is to be molded (in this case, the lower and upper molds are respectively divided into portions 32a to 32c, and 33a to 33c, and horizontal position regulating members 34 and 35 are provided around the portions 32a to 32c, and 33a to 33c, respectively, to form a space, between position regulating portions 38 and 39, into which an excess 37 of the glass gob flows when press molding is performed in a cylindrical mold 36). As shown in FIG. 14, when a swell-out portion 40 corresponding to the glass gob excess is formed around the molded optical element, this swell-out portion 40 is present very close to a portion 45 (part of the optical functional surface) on, e.g., side surfaces 41 and 42 of the optical element. The deformation amount of glass is large in the swell-out portion 40 and the outermost portion of the swell-out portion 40 is not regulated by the mold during molding. This adversely affects the planar precision of the peripheral portion of the swell-out portion 40.

In this manner, if the edge portion of an optical functional surface 43, or optical functional surfaces 44 and 45 transferred from the molding surface of the upper or lower mold vertically changes and does not have a constant height, the swell-out portion 40 of the glass gob can degrade the planar precision.

In recent years, as the types and variations of optical elements increase, even in molded optical elements such as glass-molded lenses, a demand for molding one having an axially asymmetrical shape increases. When molding an optical element having a general axially asymmetrical shape, it is naturally molded by using an axially asymmetrical mold. During press molding, deformation of the glass material in the horizontal direction is accordingly axially asymmetrical. Assume that such an optical element is to be molded by using a conventionally used mold structure in which the vertical size of the gap, that defines a glass excess, around the edges of the molding surfaces of the upper and lower molds is kept constant. In this case, depending on the relationship between the shape of the glass material before molding and the mold shape, the softened glass may quickly fill even the corners of the mold during molding to result in cracking or cutout during later press molding. Alternatively, the softened glass may not sufficiently fill the corners of the mold even after press molding. The optical functional surface is not perfectly transferred from the molding surface, leading to a molded product having a cut optical functional surface, i.e., a filling defect.

SUMMARY OF THE INVENTION

The present invention has been made on the basis of the above situation, and has as its first object to provide a molding apparatus in which a mold for an optical element is designed such that a swell-out portion from a glass material (gob) is located as far as possible from the edges of the molding surfaces of upper and lower molds and from the regulating portions of the respective peripheral regulating members so that, the peripheral regulating members are machined as designed to allow maintaining a high planar precision, an optical functional surface and a lens mounting reference can be molded simultaneously and an optical element having an appropriate lens thickness can be obtained for a molded optical element, an optical element molding method, and an optical element and prism as molded products.

The second object of the present invention is to provide a molding apparatus in which the vertical distance of a space, around molding surfaces of upper and lower molds, into which a glass gob excess flows into, is intentionally formed to have relatively wide and narrow portions so that, during press molding of a glass material (gob), a pressure acting on softened glass at this portion is adjusted by means of a difference in flowability of glass to uniform a pressure distribution generated in the glass material, thus obtaining a good optical element free from burr on the ridge of the molded product, an optical element molding method, and an optical element and prism as molded products.

In order to achieve the first object, according to the present invention, there is provided a molding apparatus for thermally softening a glass material and pressing the glass material with upper and lower molds, thereby molding the glass material, characterized by comprising a lower mold having one molding surface on an upper surface thereof, a lower periphery regulating member for fitting on an outer surface of the lower mold to regulate an excess of the glass material swelling outward from the molding surface of the lower mold, an upper mold having the other molding surface on a lower surface thereof, and an upper periphery regulating member for fitting on an outer surface of the upper mold to regulate the excess of the glass material swelling outward from the molding surface of said upper mold, wherein when at least one of the upper and lower molds is moved vertically to press-mold the thermally softened glass material with the molding surfaces, the excess of the glass material flows into a space formed by upper and lower ends of the lower and upper periphery regulating members, respectively, and positions of the upper and lower ends of the space where the excess of the glass material flows into change vertically along edges of the molding surfaces to correspond to shapes of the two molding surfaces.

In this case, the positions of the upper and lower ends of the space where the excess of the glass material flows into are preferably set to be as far as possible from the molding surfaces of the upper and lower molds, and furthermore the upper and lower ends of the two periphery regulating members are preferably formed of combinations of arcs and straight lines that are continuous along the edges of the molding surfaces.

In an optical element molded with a molding apparatus for thermally softening a glass material and pressing the glass material with upper and lower molds and having a space, where an excess of the glass material flows into, around molding surfaces of the upper and lower molds, a portion formed by the space where the excess of the glass flows into is located at positions that vertically change along edges of transfer surfaces in accordance with shapes of the transfer surfaces transferred from the molding surfaces.

Therefore, in accordance with the shape of the optical element, e.g., an lens described above, and the shape of the mold for molding this optical element, the optical functional surface of the optical element and the mounting reference for it can be formed simultaneously by one molding operation, the thickness of the optical element can be stably obtained regardless of variations in weight of the glass material, and degradation in planar precision caused by the presence of the swell-out portion can be minimized.

In order to achieve the second object, according to the present invention, there is provided a molding apparatus for thermally softening a glass material and pressing the glass material with upper and lower molds, thereby molding the glass material, characterized by comprising a lower mold having one molding surface on an upper surface thereof, a lower periphery regulating member for fitting on an outer surface of the lower mold to regulate an excess of the glass material swelling outward from the molding surface of the lower mold, an upper mold having the other molding surface on a lower surface thereof, and an upper periphery regulating member for fitting on an outer surface of the upper mold to regulate the excess of the glass material swelling outward from the molding surface of the upper mold, wherein when at least one of the upper and lower molds is moved vertically to press-mold the thermally softened glass material with the molding surfaces, the excess of the glass material flows into a space formed by upper and lower ends of the lower and upper periphery regulating members, respectively, and a distance between the upper and lower ends of the space where the excess of the glass material flows into changes along edges of the molding surfaces in accordance with a deformation amount of the glass material molded by the two molding surfaces.

In this case, the distance between the upper and lower ends preferably changes so that, when the thermally softened glass material is pressed, a vertical distance of the space where the excess of the glass material flows into is relatively large to correspond to a portion having a large deformation amount of the glass material, at edges of the mold surfaces close to the portion having a large deformation amount, and is relatively small to correspond to a portion having a small deformation amount of the glass material, at edges of the molding surfaces close to the portion having a small deformation amount.

Furthermore, there is provided an optical element molded with a molding apparatus for thermally softening a glass material and pressing the glass material with upper and lower molds and having a space, where an excess of the glass material flows into, around molding surfaces of the upper and lower molds, characterized in that a portion formed by the space where the excess of the glass flows into is formed with a thickness that changes vertically along edges of transfer surfaces transferred from the molding surfaces in accordance with a distance between the transfer surfaces.

In this case, the optical element preferably has a thickness that changes vertically along the edges of the transfer surfaces, so as to be large at a portion formed of the space where the excess of the glass material flows into to correspond to a portion having a large deformation amount of the glass material during press molding, and to be small at a portion formed of the space where the excess of the glass material flows into to correspond to a portion having a small deformation amount of the glass material.

Therefore, when the mold having the shape described above is used, the press molding process can be performed such that the glass material swells out equally at any portion around the molding surfaces of the upper and lower molds. Glass can accordingly completely fill all the corners of the mold. In a molded optical element, cracking, cutout, and fusion of glass on the mold can be prevented, and a good planar precision can be obtained.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 20 is a perspective view of a glass-molded lens molded with the mold shown in FIG. 18;

FIG. 30 is a schematic diagram of a reflecting optical system according to the third embodiment of the present invention;

FIG. 35 is a side view of the glass-molded lens according to the third embodiment;

DETAILED DESCRIPTION OF THE PREFERRED EMBODIMENTS (First Embodiment)

Figure 1:
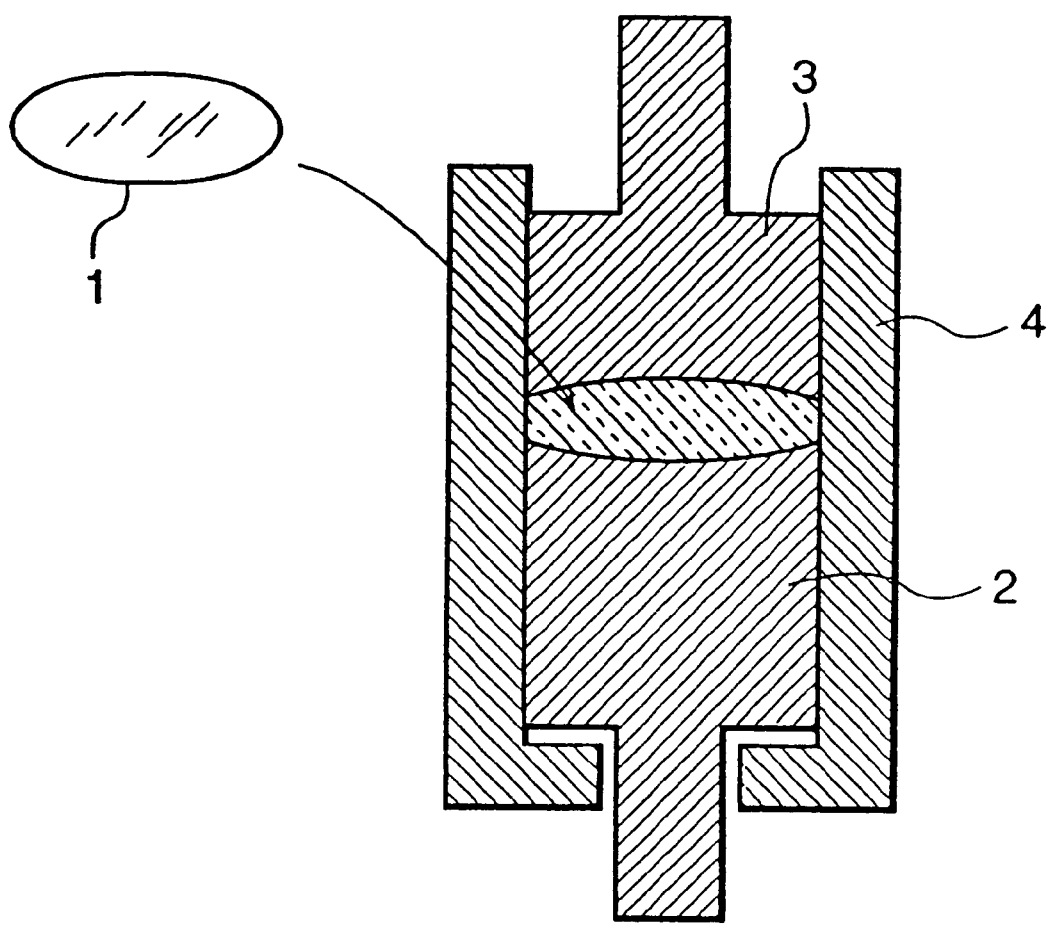
FIG. 1 is a sectional view showing the arrangement of a conventional mold for glass molding.
Figure 2:
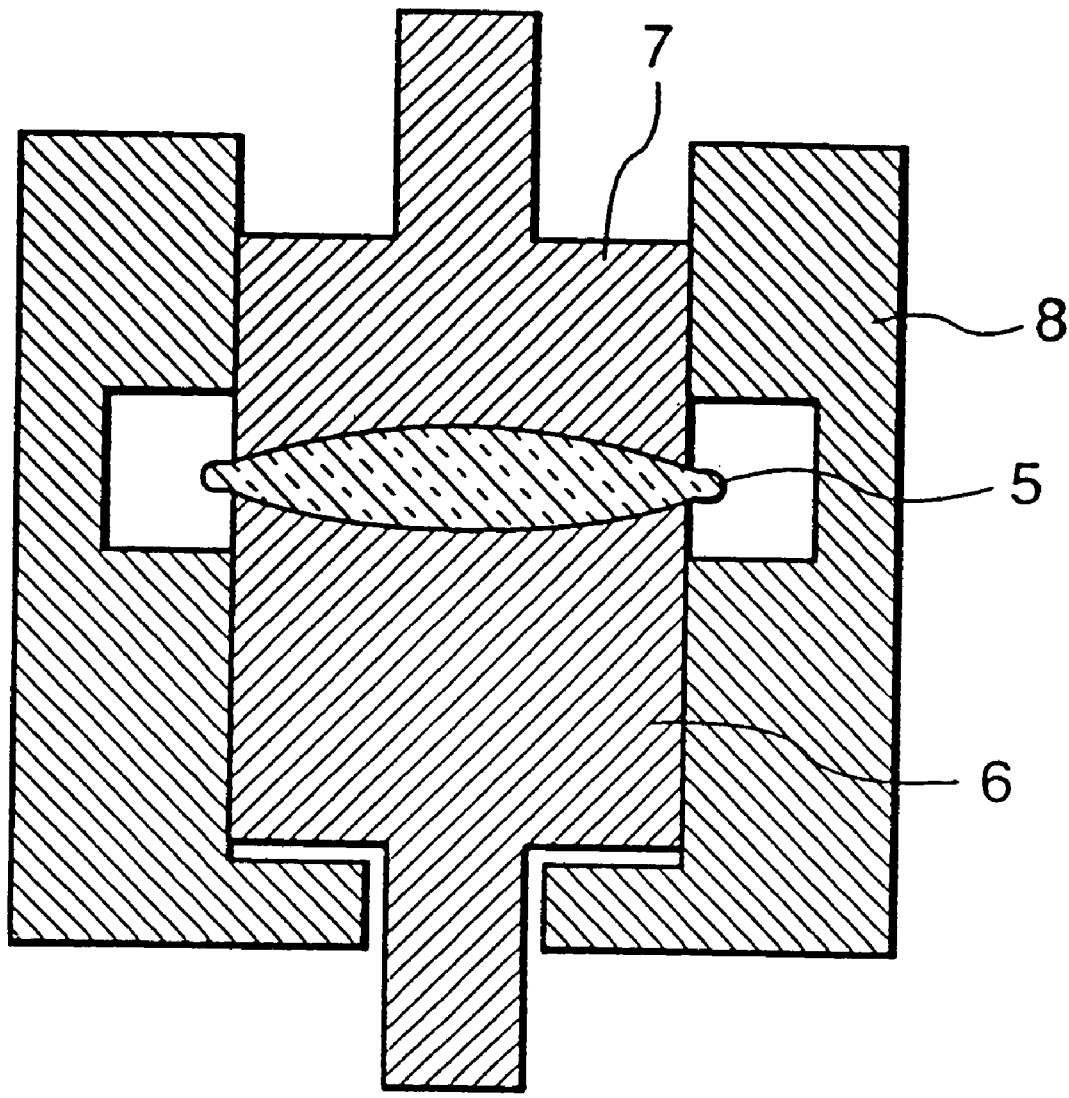
FIG. 2 is a sectional view showing the arrangement of another conventional mold for glass molding.
Figure 3:
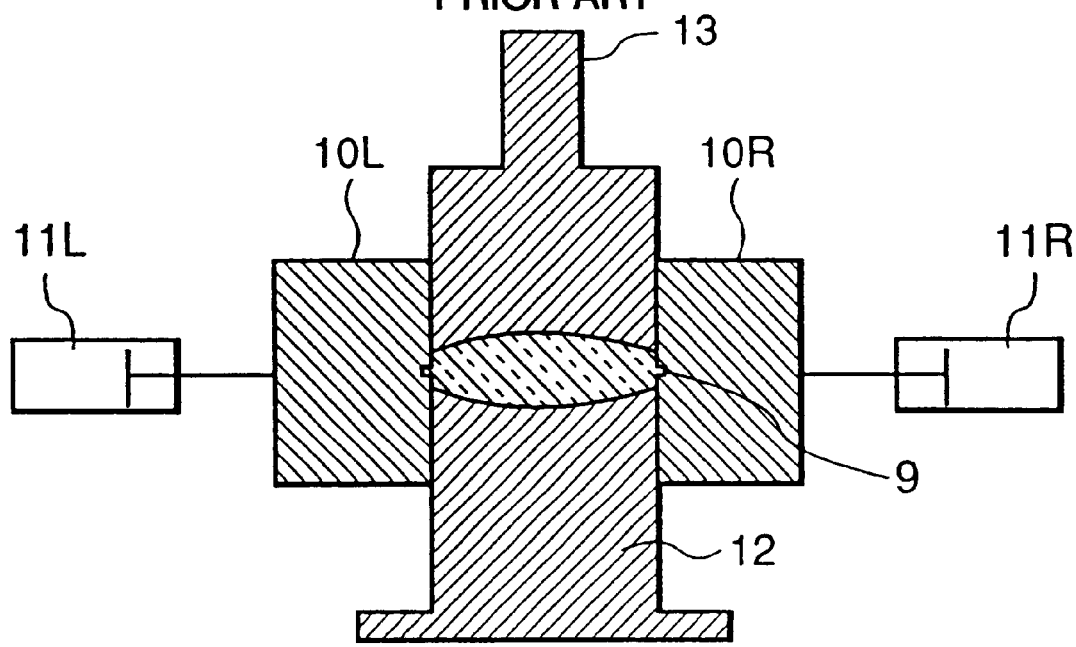
FIG. 3 is a sectional view showing the arrangement of still another conventional mold for glass molding.
Figure 4:
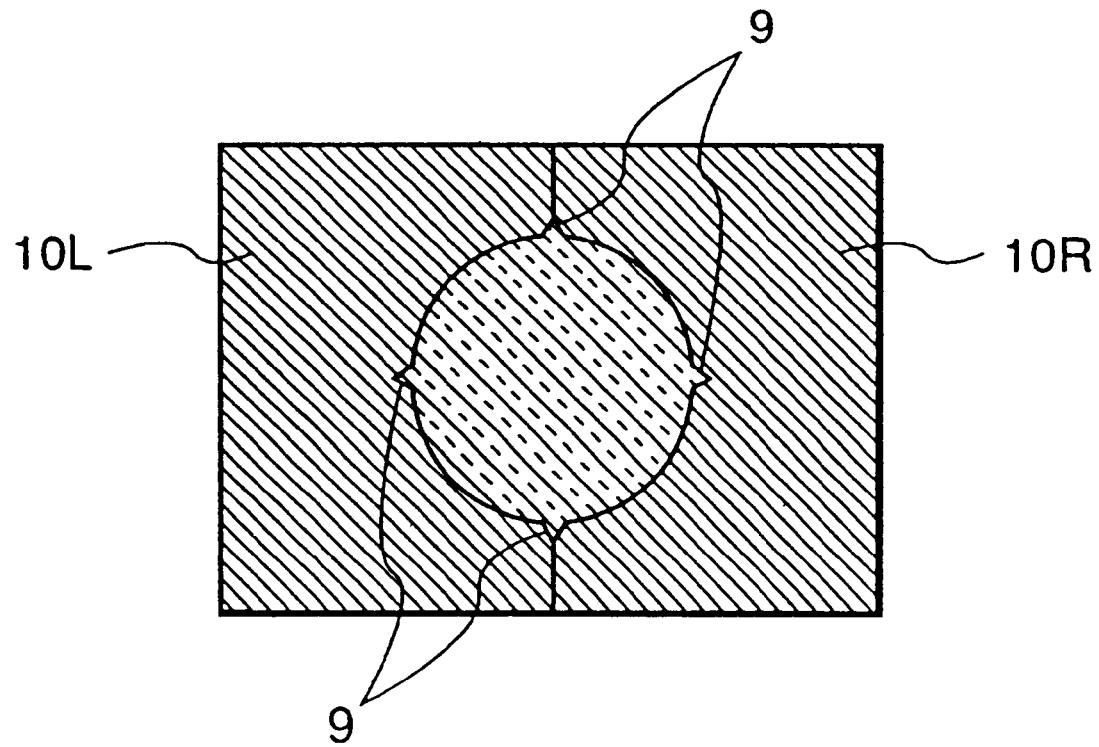
FIG. 4 is a sectional view of the same seen from the above.
Figure 5:
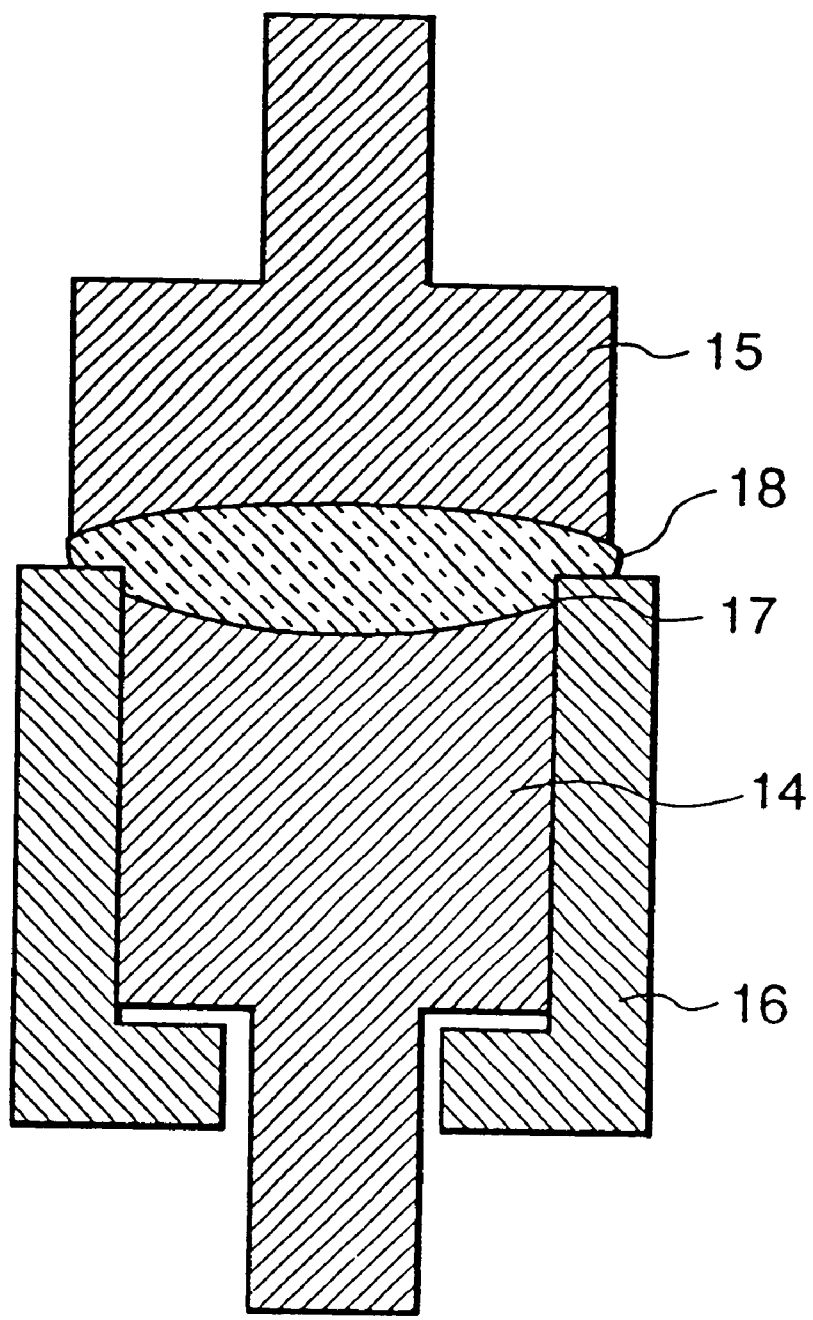
FIG. 5 is a sectional view showing the arrangement of still another conventional mold for glass molding.
Figure 6:
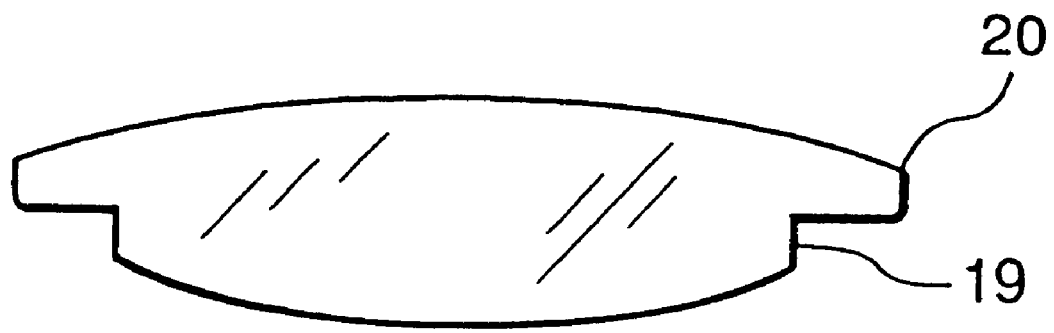
FIG. 6 is a sectional view of a conventional glass-molded lens molded with this mold.
Figure 7:
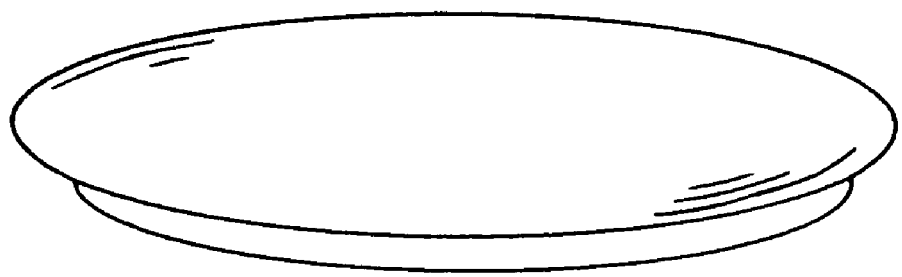
FIG. 7 is a perspective view of the same.
Figure 8:
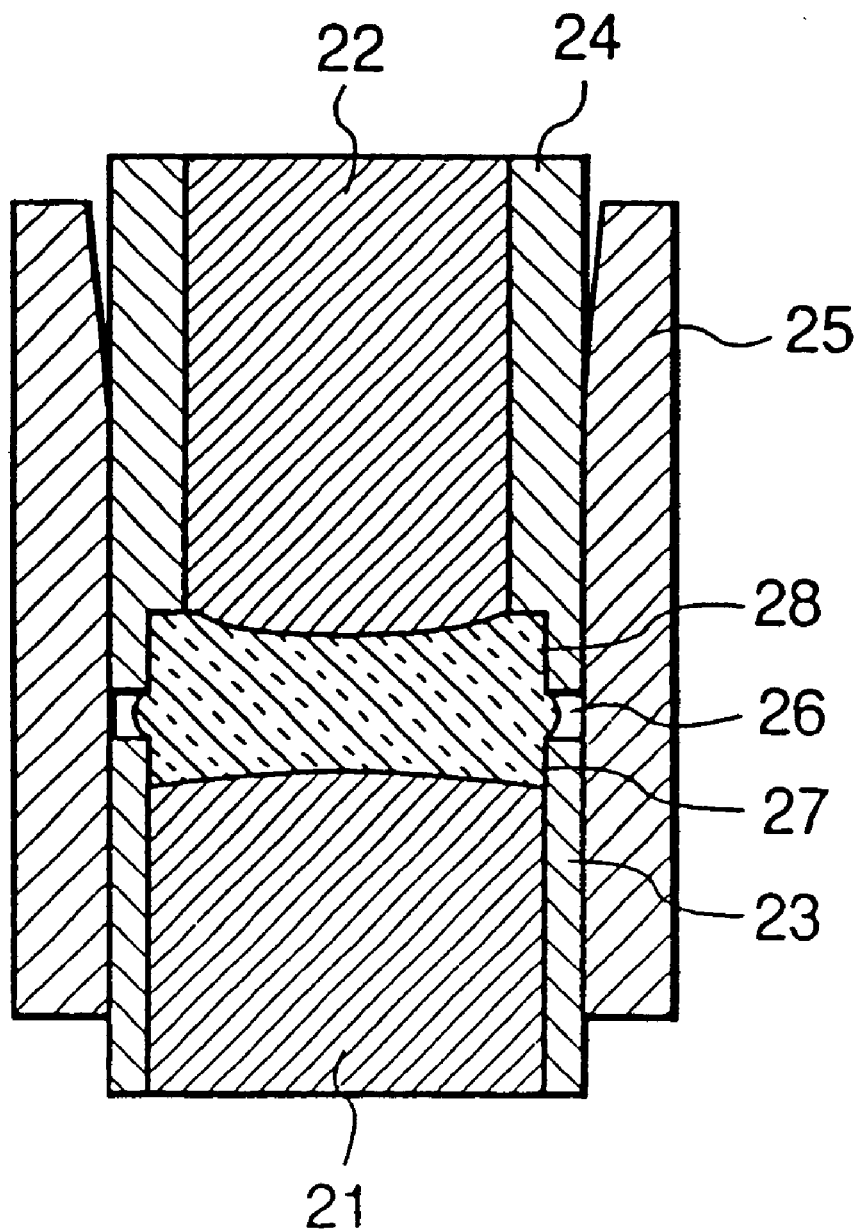
FIG. 8 is a sectional view showing the arrangement of still another conventional mold for glass molding.
Figure 9:
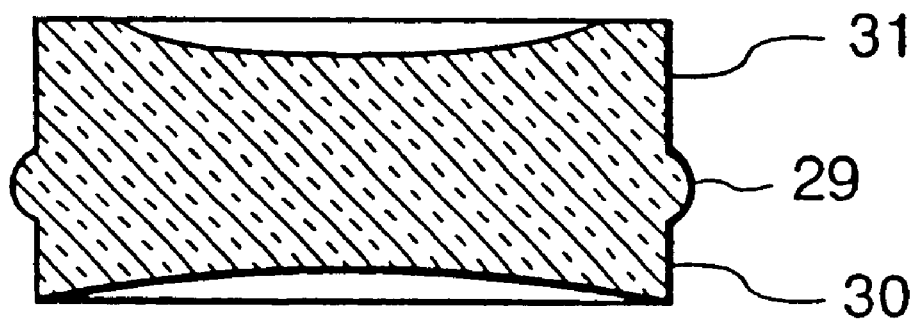
FIG. 9 is a sectional view of a conventional glass-molded lens molded with this mold.
Figure 10:
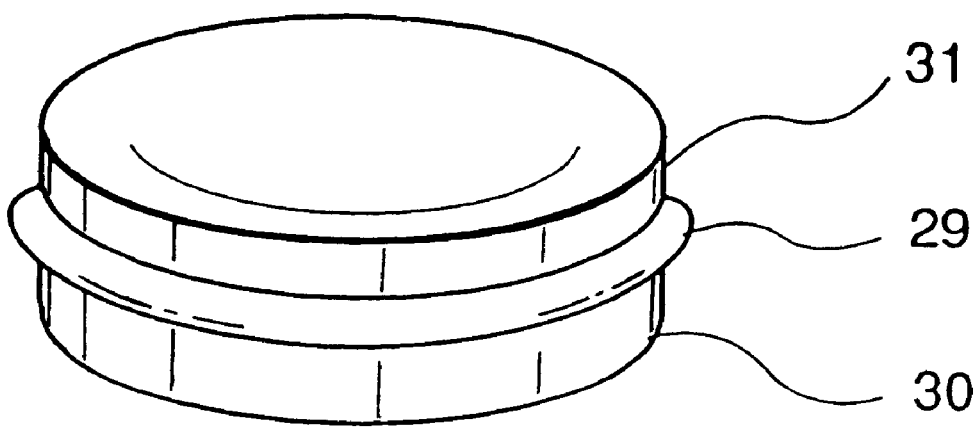
FIG. 10 is a perspective view of the same.
Figure 11:
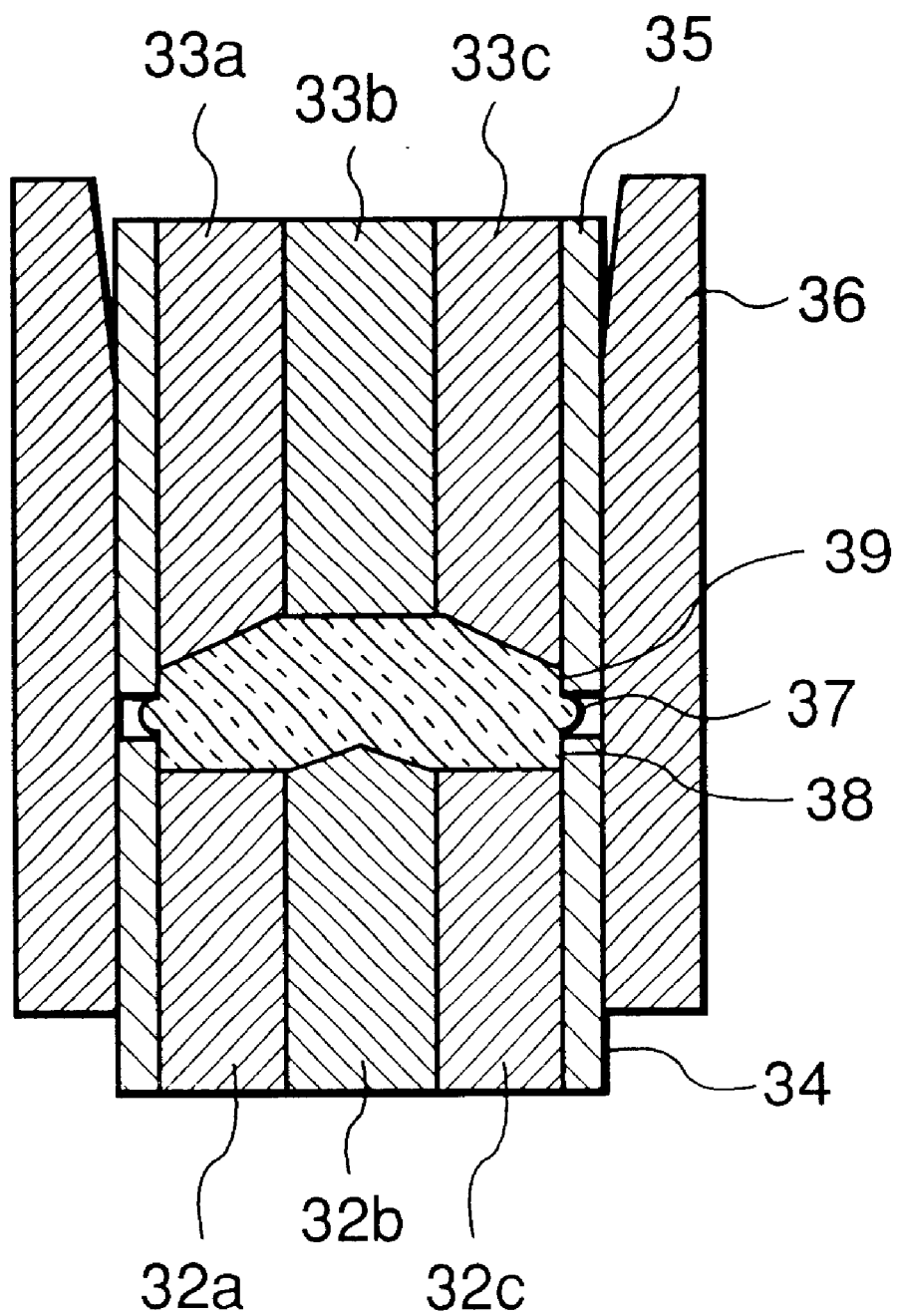
FIG. 11 is a sectional view showing the arrangement of a mold according to the first embodiment of the present invention.
Figure 12:
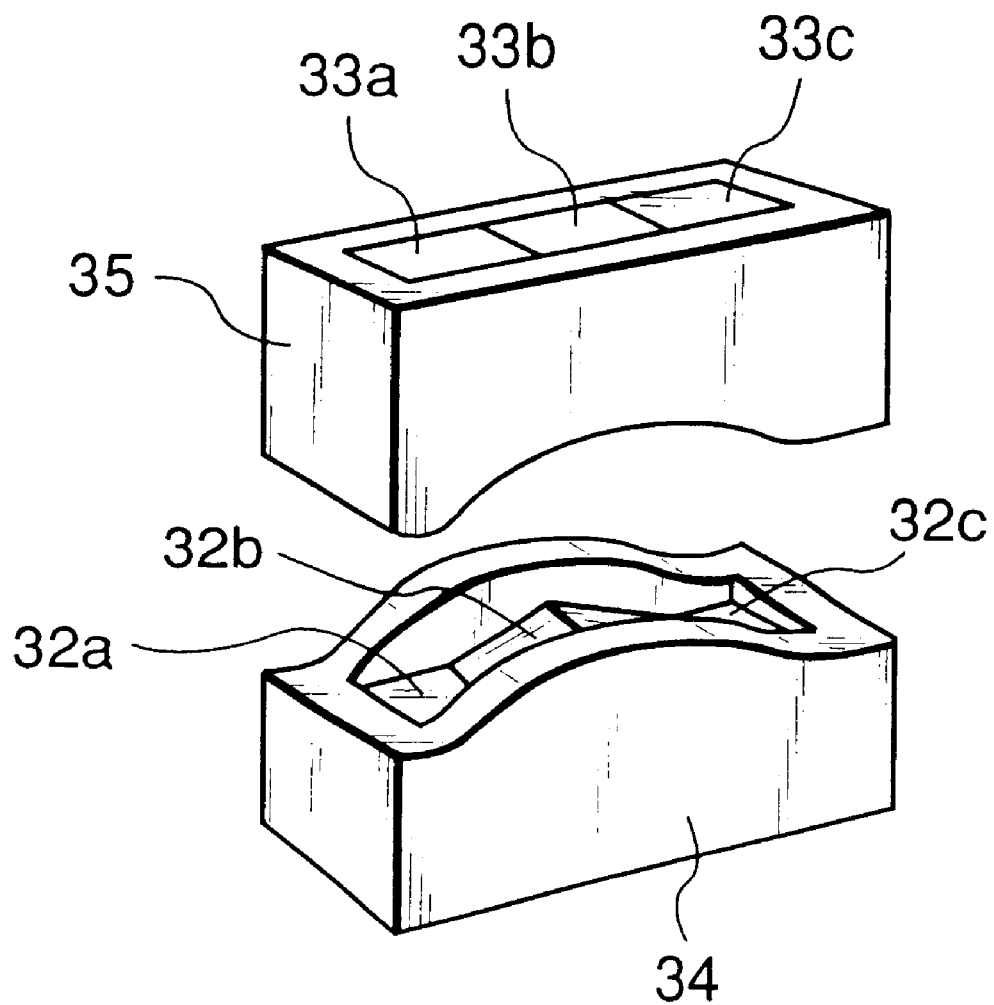
FIG. 12 is a perspective view of the same.
Figure 13:
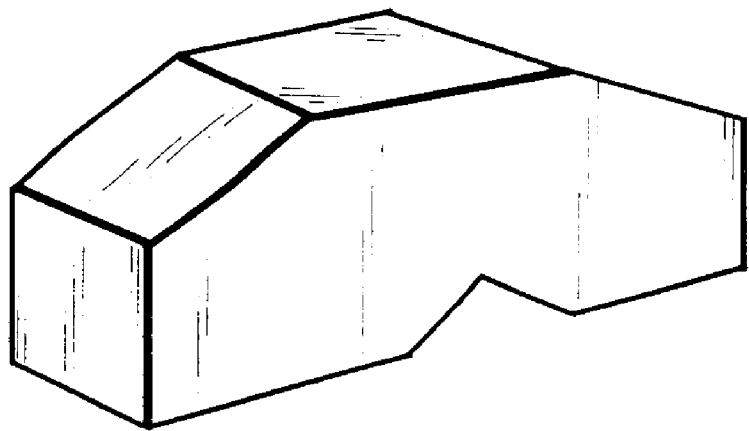
FIG. 13 is a perspective view showing the ideal pattern of a glass-molded lens according to the present invention.
Figure 14:
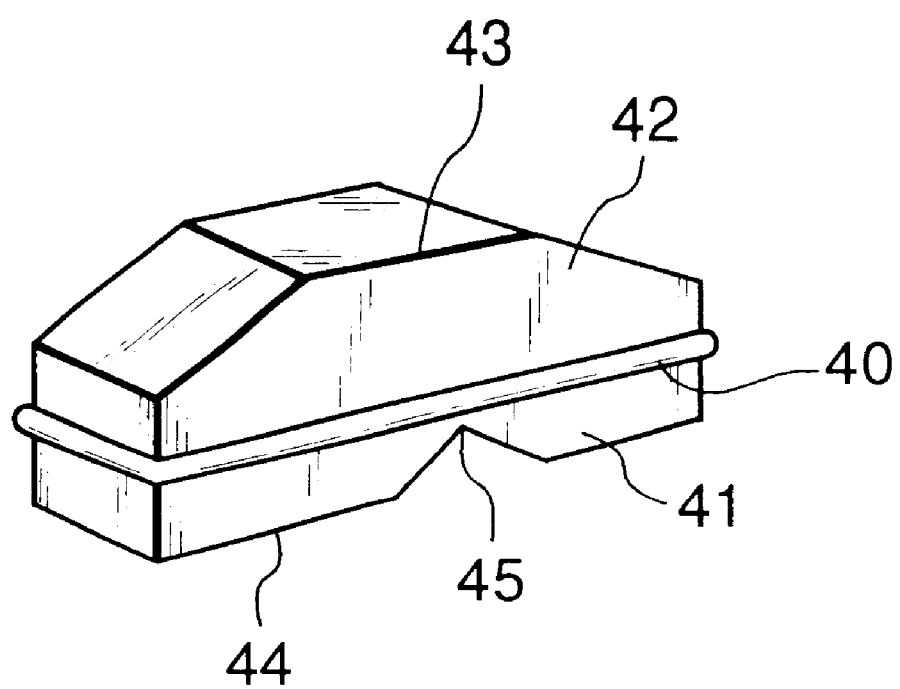
FIG. 14 is a perspective view of a conventional glass-molded lens for comparison with the present invention.
Figure 15:
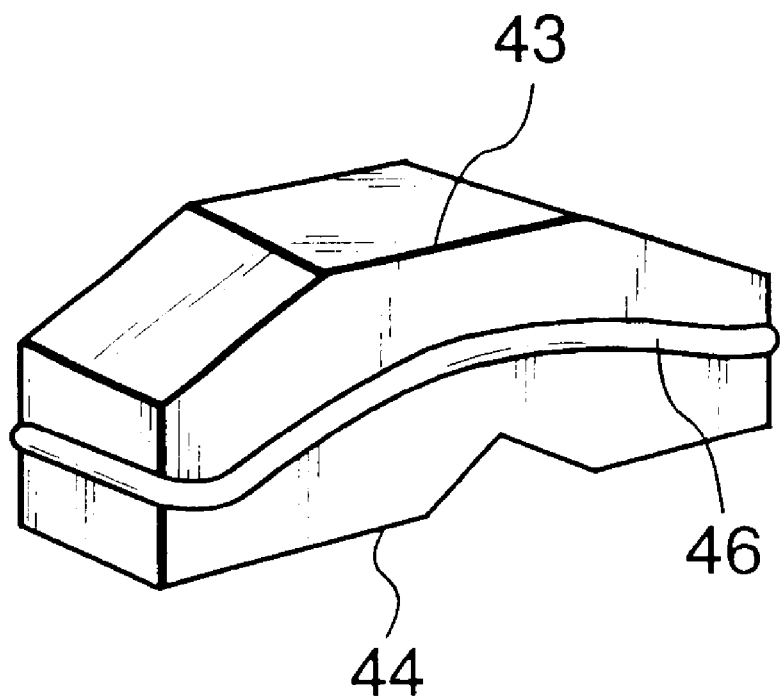
FIG. 15 is a perspective view of a glass-molded lens according to the present invention.

The first embodiment of the present invention will be described in detail with reference to FIGS. 11 to 16. A mold for glass molding according to this embodiment has an arrangement as shown in FIG. 11. FIGS. 12 and 15 are perspective views respectively showing a mold according to the present invention and an optical element (glass lens) as a product molded with this mold.

This molding apparatus has a lower mold 32, a lower periphery regulating member 34, an upper mold 33, and an upper periphery regulating member 35. The lower mold 32 has one molding surface on its upper surface. The lower periphery regulating member 34 fits on the outer surface of the lower mold 32 and regulates an excess of a glass material swelling outward from the molding surface of the lower mold 32. The upper mold 33 has the other molding surface on its lower surface. The upper periphery regulating member 35 fits on the outer surface of the upper mold 33 and regulates the excess of the glass material swelling outward from the molding surface of the upper mold 33. When at least one of the upper and lower molds 33 and 32 is moved vertically to press-mold the thermally softened glass material with the molding surfaces, an excess 37 of the glass material flows into a space formed by upper and lower ends 39 and 38 of the lower and upper periphery regulating members 34 and 35, respectively. The positions of the upper and lower ends 38 and 39 of the space where the excess of the glass material flows into change vertically in accordance with the shapes of the two molding surfaces along the molding surfaces (see FIG. 12).

Referring to FIGS. 11 and 12, reference numerals 32*a*, 32*b*, and 32*c* denote the mold members of the lower mold 32 that partially constitute the respective discontinuous flat portions of the molding surface as they are divided into three portions; and 33*a*, 33*b*, and 33*c*, the mold members of the upper mold 33 that partially constitute the respective discontinuous flat portions of the molding surface as they are divided into three portions. The upper periphery regulating member 35 regulates the edge of the upper molding surface (this serves as the frame mounting reference surface of a molded optical element to be described later). The lower periphery regulating member 34 regulates the edge of the lower molding surface. The upper and lower periphery regulating members 35 and 34 are slidably arranged on the inner wall of a cylindrical mold 36.

How to mold an optical element, and particularly an axially asymmetrical glass lens, by using the mold for glass molding having the above arrangement will be described.

A glass material (gob) is placed between the upper and lower molds 33 and 32. The entire mold is heated to indirectly soften, by heating, the glass material to a required temperature. When the glass material is softened at a predetermined temperature, the lower mold 32 and lower periphery regulating member 34 are fixed. The upper mold 33 and the upper periphery regulating member 35 are integrally moved downward to press the glass material to a height corresponding to a predetermined thickness of the optical element to be molded, thereby performing press molding.

A space for receiving the swell-out portion 37 of the glass material is present between the lower end 39 of the upper periphery regulating member 35 and the upper end 38 of the lower periphery regulating member 34. Excessive glass flows out into this space to form a molded product having a constant thickness without being affected by variations in volume of the glass gob.

In this embodiment, the shape of the gap into which the glass material swells out is designed and machined in the following manner. Namely, as shown in FIG. 15, the gap must be as far as possible from both a portion where the peripheral portions of the mold members 33*a*, 33*b*, and 33*c* of the upper mold 33 come into contact with the upper periphery regulating member 35, i.e., a portion corresponding to one optical functional surface 43 of the optical element, and a portion where the peripheral portions of the mold members 32*a*, 32*b*, and 32*c* of the lower mold 32 come into contact with the lower periphery regulating member 34, i.e., a portion corresponding to the other optical functional surface 44 of the optical element. Also, the gap must be constituted by continuation of arcs and straight lines that continuously change in the vertical direction.

The entire mold is cooled down. When the mold reaches a predetermined temperature, it is opened, and the molded optical element (glass lens) is extracted. In the product molded with this mold, as shown in FIG. 15, its swell-out portion 46 is as far as possible from the upper and lower optical functional surfaces at any portion of the edges of the optical functional surfaces of the optical element. Hence, an adverse influence on the optical functional surfaces, such as degradation in planar precision at a position close to the glass swell-out portion, can be minimized.

As in this embodiment, according to the present invention, an optical element such as a glass-molded lens, which has positioning reference surfaces, a high lens thickness precision, and a high planar precision can be obtained easily with a simple mold arrangement.

Figure 16:
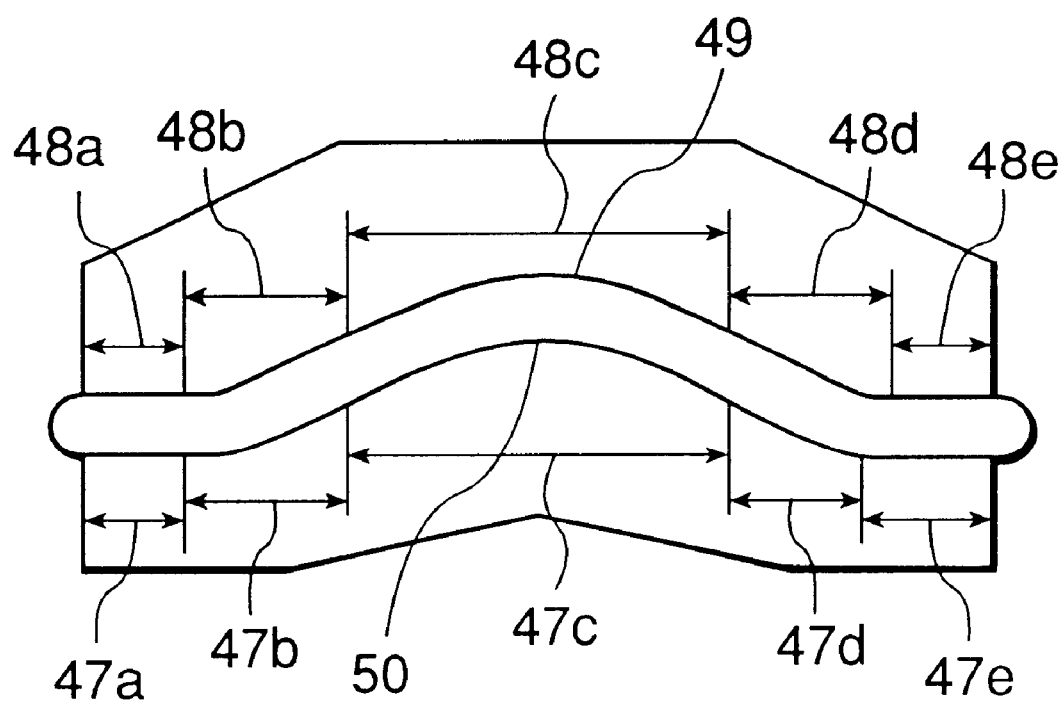
FIG. 16 is a side view of the same.

An optical element molded according to this embodiment will be described in detail with reference to FIG. 16.

In this embodiment, the upper surface of the swell-out portion of the optical element forms a curved shape 49 transferred from the shape of the lower end face of the upper periphery regulating member of the mold, and the lower surface thereof forms a curved shape 50 transferred from the shape of the upper end face of the lower periphery regulating member of the mold. Each of the curved shapes 49 and 50 is constituted by the combination of arcs and straight lines and changes in the vertical direction (in FIG. 16, continuation of regions 48*a* to 48*e*, and 47*a* to 47*e*; i.e., reference numerals 47*a*, 47*e*, 48*a*, and 48*e* denote straight portions, and 47*b*, 47*c*, 47*d*, 48*b*, 48*c*, and 48*d*, arcuate portions). The curved shapes 49 and 50 are formed to be as far as possible from the corresponding optical functional surfaces.

Although these shapes may be formed by designing the lower end face of the upper periphery regulating member 35 and the upper end face of the lower periphery regulating member 34 by employing spline curves and free curves, it makes design and machining cumbersome, and takes time, leading to an increase in cost. If, however, the combination of arcs and straight lines is employed, designing of the lower end face of the upper periphery regulating member 35 and the upper end face of the lower periphery regulating member 34 can be simplified, and the mold machining apparatus can be controlled easily. The completed figure forms a continuously, smoothly changing curve having no vertically discontinuous portion. Hence, a crack or cutout is not formed easily in this curved portion of the optical element.

(Second Embodiment)

The second embodiment of the present invention will be described with reference to FIGS. 17 to 26.

Figure 17:
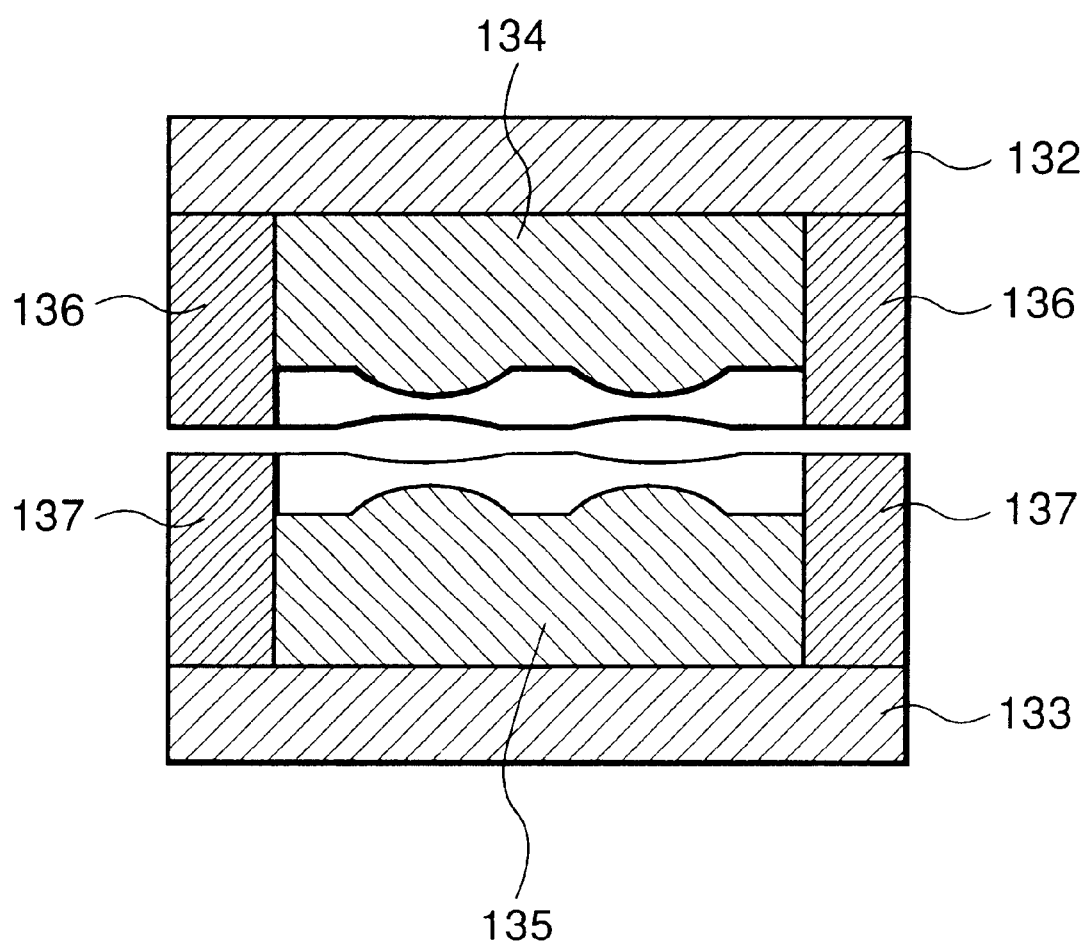
FIG. 17 is a sectional view showing the arrangement of a mold according to the second embodiment of the present invention.
Figure 18:
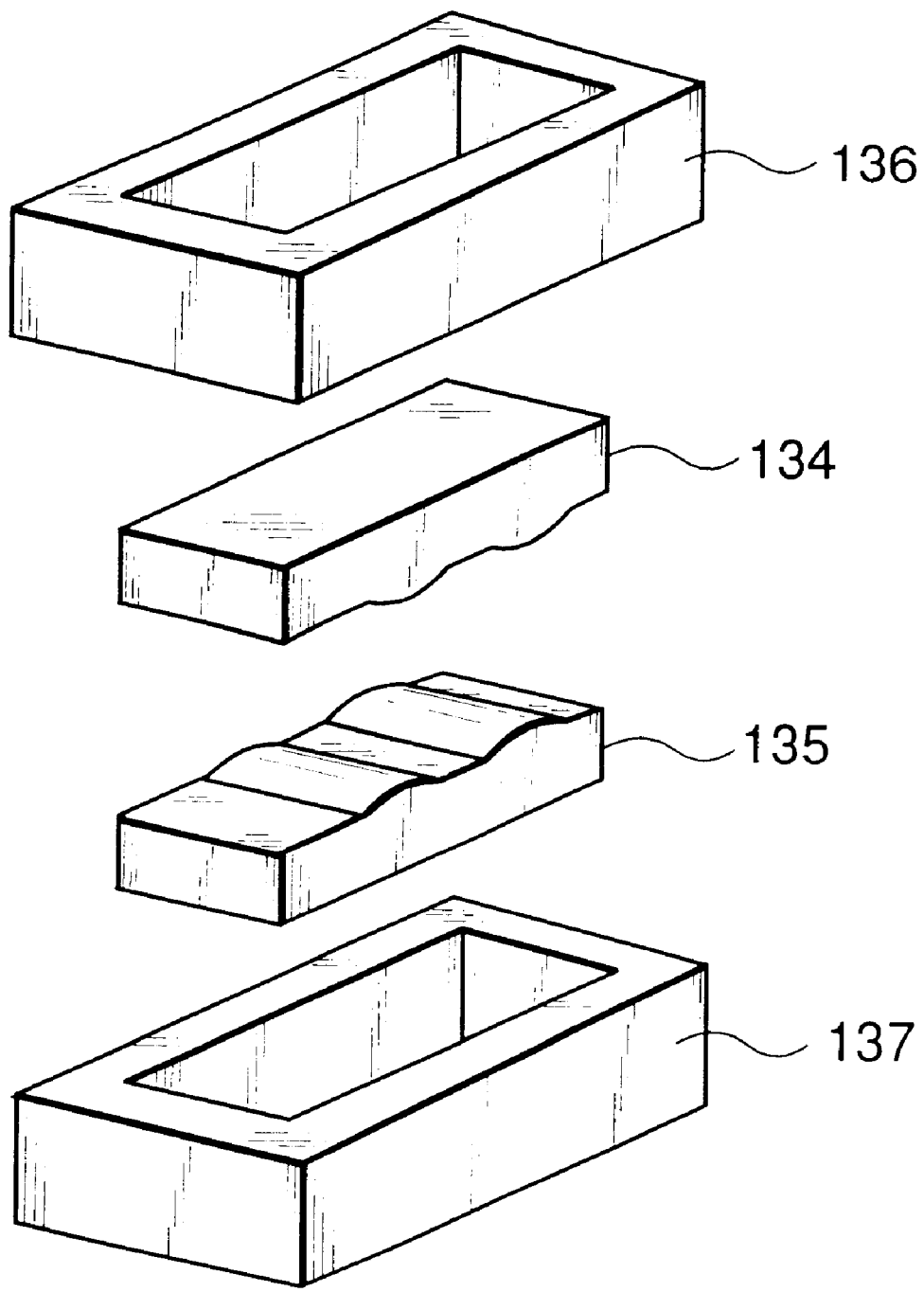
FIG. 18 is an exploded perspective view of a conventional mold for glass molding corresponding to the mold of the second embodiment.
Figure 19:
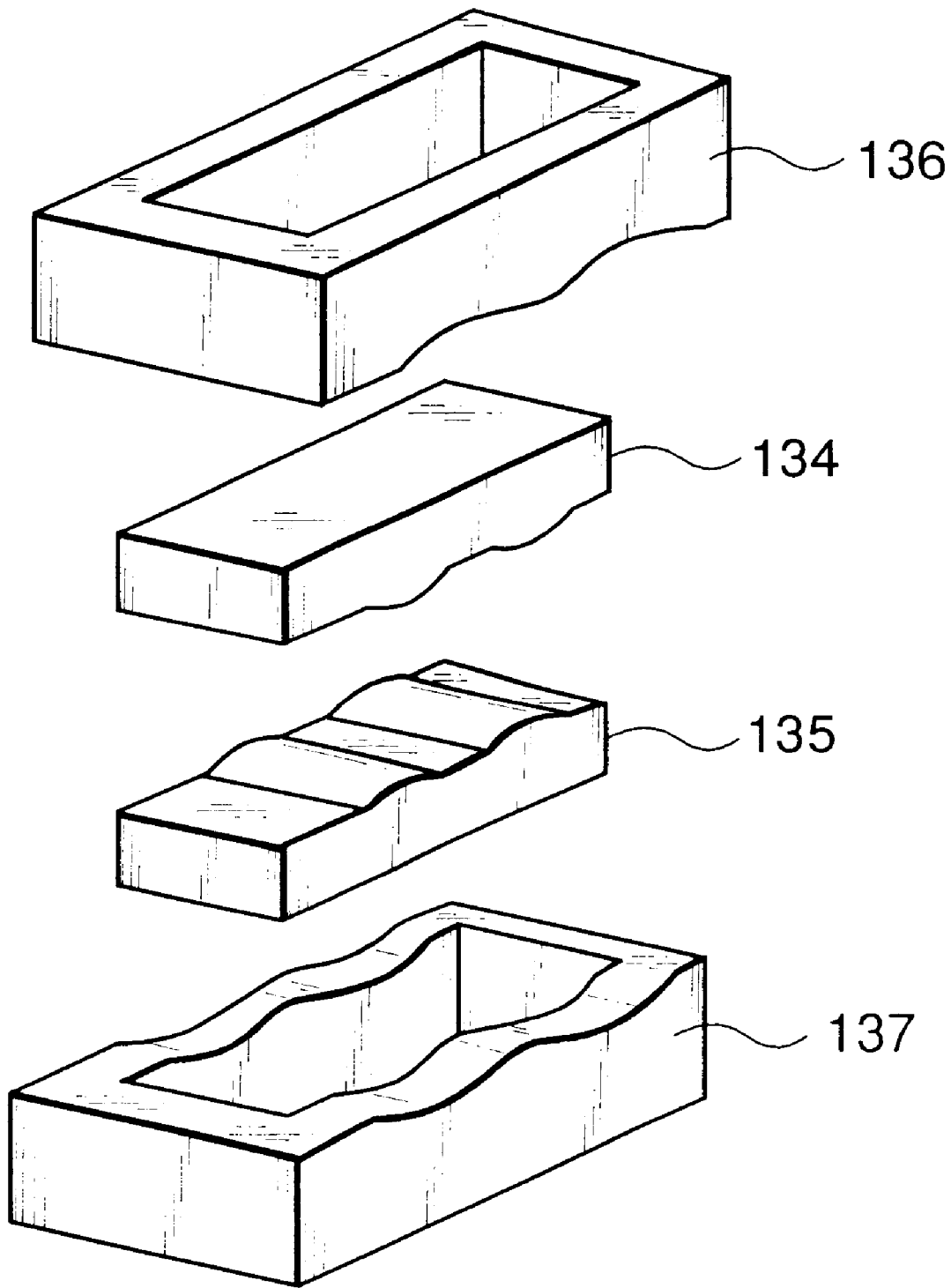
FIG. 19 is an exploded perspective view of the mold according to the second embodiment of the present invention.
Figure 21:
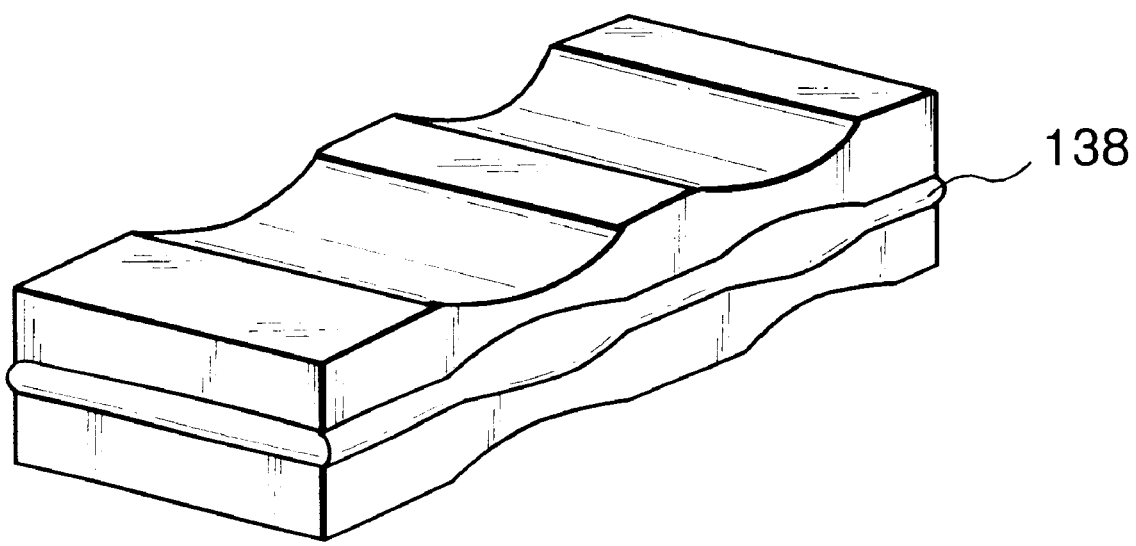
FIG. 21 is a perspective view of a glass-molded lens molded with the mold shown in FIG. 19.

The mold shown in FIGS. 17 and 19 is the one for an optical element such as a glass-molded lens according to the second embodiment of the present invention, and FIG. 21 shows an optical glass element as the molded product. For comparison with this embodiment, FIG. 18 shows a conventional mold for an optical element such as a glass-molded lens, and FIG. 20 shows an optical glass element as the molded product.

As shown in FIG. 20, an excess 138 as the swell-out portion of the conventional glass material has a constant thickness in the vertical direction. Independently of the press deformation amounts of the molding surfaces differing depending on locations to lead to a change in shape, the end faces of periphery regulating members 136 and 137 of upper and lower molds 134 and 135 shown in FIG. 18 are straight. In this case, the swelling-out amount in the horizontal direction becomes nonuniform in accordance with the press deformation amount, and also a crack or cutout is formed easily.

The mold of the second embodiment shown in FIGS. 17 and 19 has a lower mold 135, a lower periphery regulating member 137, an upper mold 134, and an upper periphery regulating member 136. The lower mold 135 has one molding surface on its upper surface. The lower periphery regulating member 137 fits on the outer surface of the lower mold 135 and regulates an excess of a glass material swelling outward from the molding surface of the lower mold 135. The upper mold 134 has the other molding surface on its lower surface. The upper periphery regulating member 136 fits on the outer surface of the upper mold 134 and regulates the excess of the glass material swelling outward from the molding surface of the upper mold 134. When at least one of the upper and lower molds 134 and 135 is moved vertically to press-mold the thermally softened glass material with the molding surfaces, an excess of the glass material flows into a space formed by the upper and lower ends of the lower and upper periphery regulating members 137 and 136, respectively. The distance between the upper and lower ends of the space where the excess of the glass material flows into changes vertically in accordance with the deformation amount of the glass material deformed by the two molding surfaces.

More specifically, in this embodiment, the distance between the upper and lower ends changes so that, when the thermally softened glass is pressed, a vertical distance of the space where the excess of the glass material flows into is set relatively large to correspond to a portion having a large deformation amount of the glass material, and is set relatively small to correspond to a portion having a small deformation amount of the glass material.

FIG. 19 shows a mold of which the distance between the upper and lower periphery regulating members 136 and 137 is set such that the thickness of the excess as the swell-out portion of the glass material according to the present invention changes. FIG. 21 shows the shape of an excess 138 at the edge of the optical element as the molded product molded with this mold. In FIG. 17, reference numeral 132 denotes an upper mold fixing plate; and 133, a lower mold fixing plate.

The molding procedure according to this embodiment will be described in detail with reference to FIGS. 22 to 29.

Figure 22:
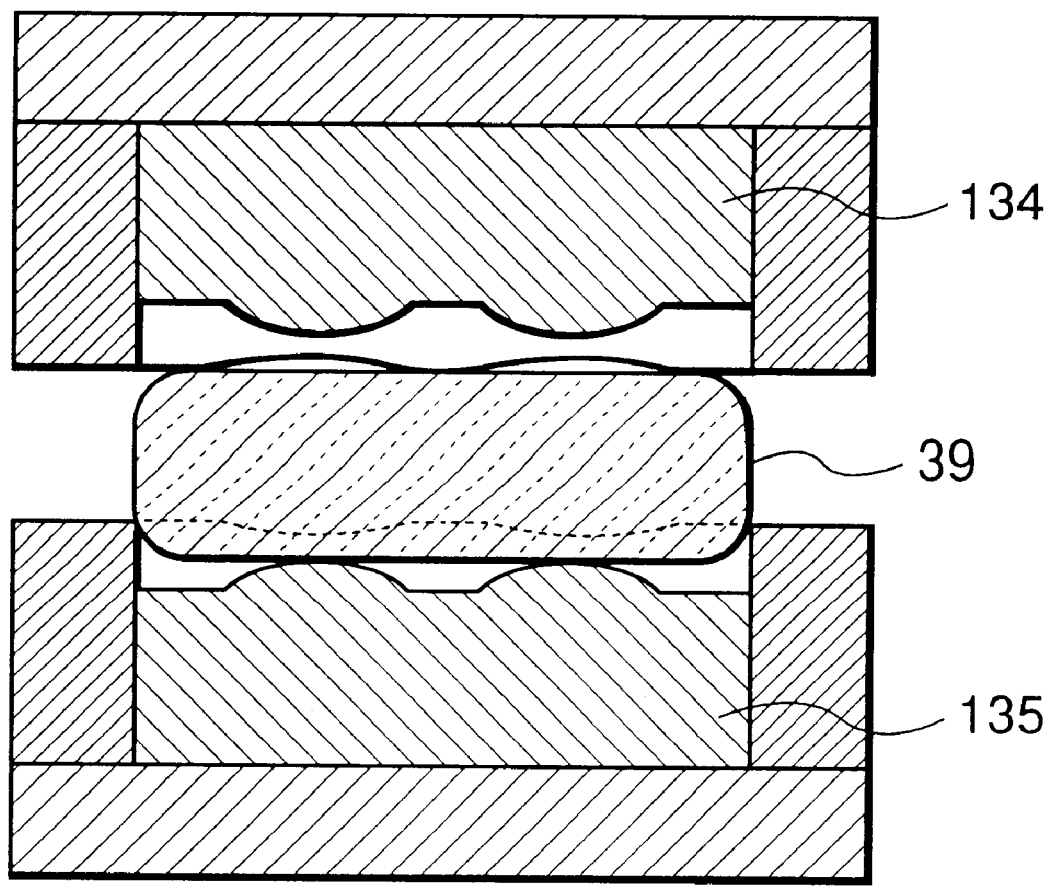
FIG. 22 is a sectional view showing the arrangement of a mold to indicate the press process in the second embodiment of the present invention.
Figure 23:
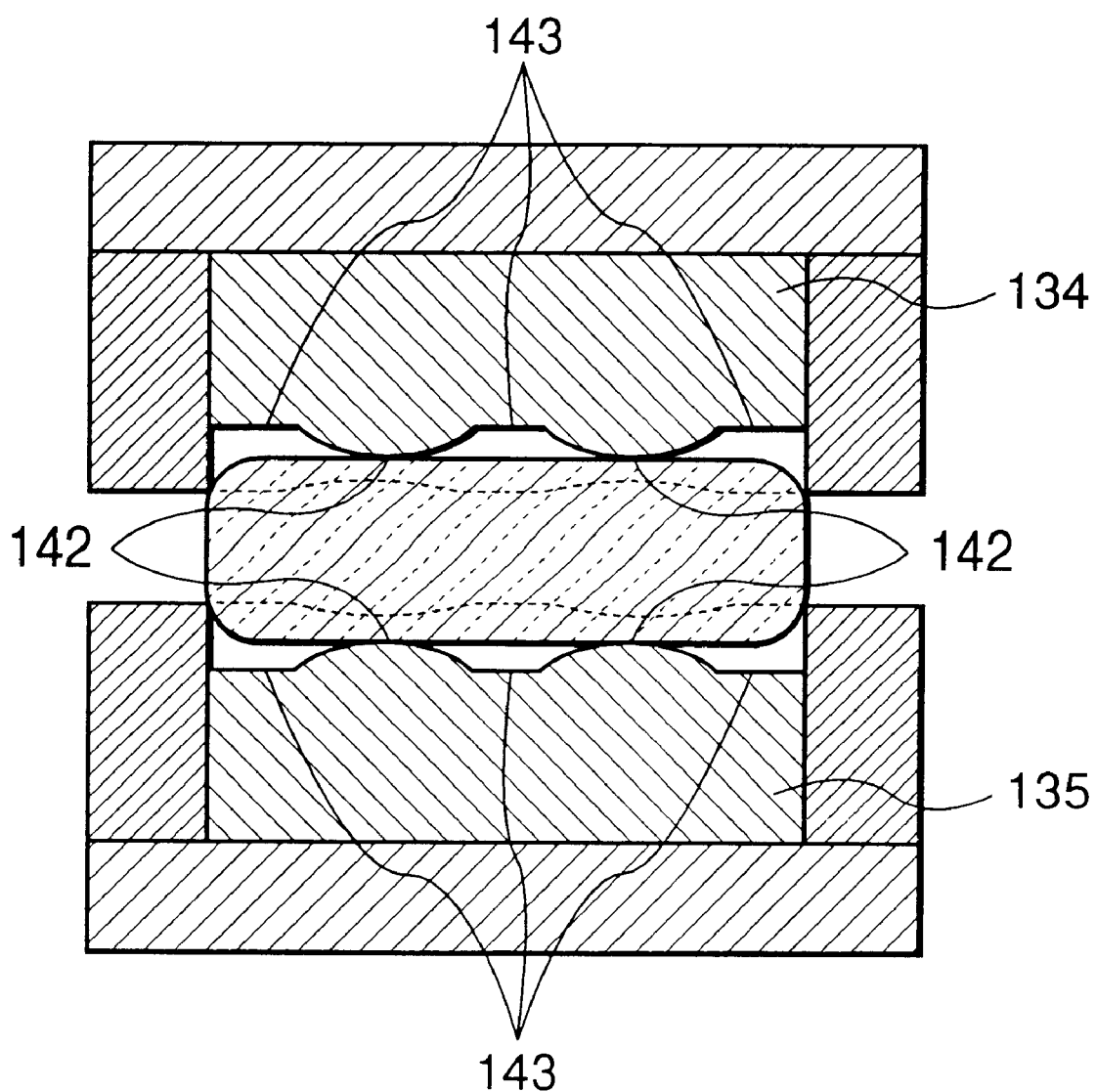
FIG. 23 is a sectional view showing the arrangement of the mold to indicate the press process (second stage) during molding in the second embodiment of the present invention.
Figure 24:
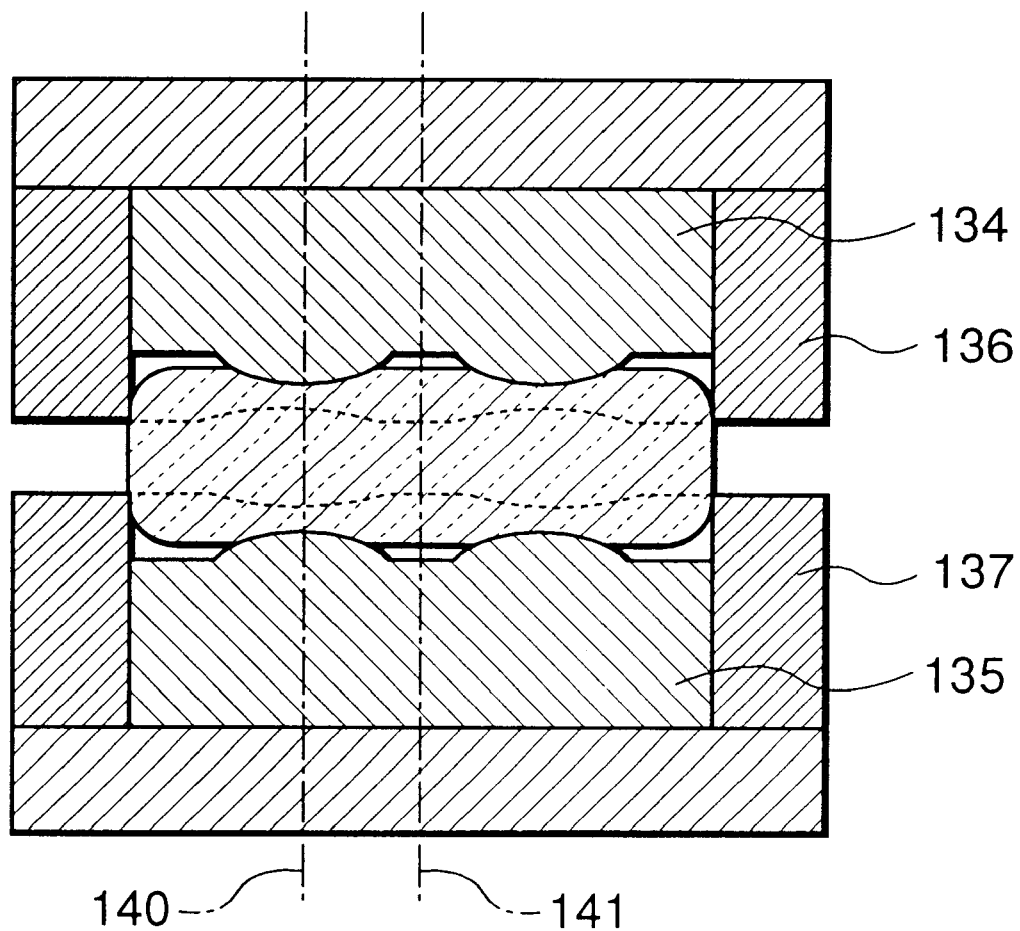
FIG. 24 is a sectional view showing the arrangement of the mold to indicate the press process (third stage) during molding in the second embodiment of the present invention.
Figure 26:
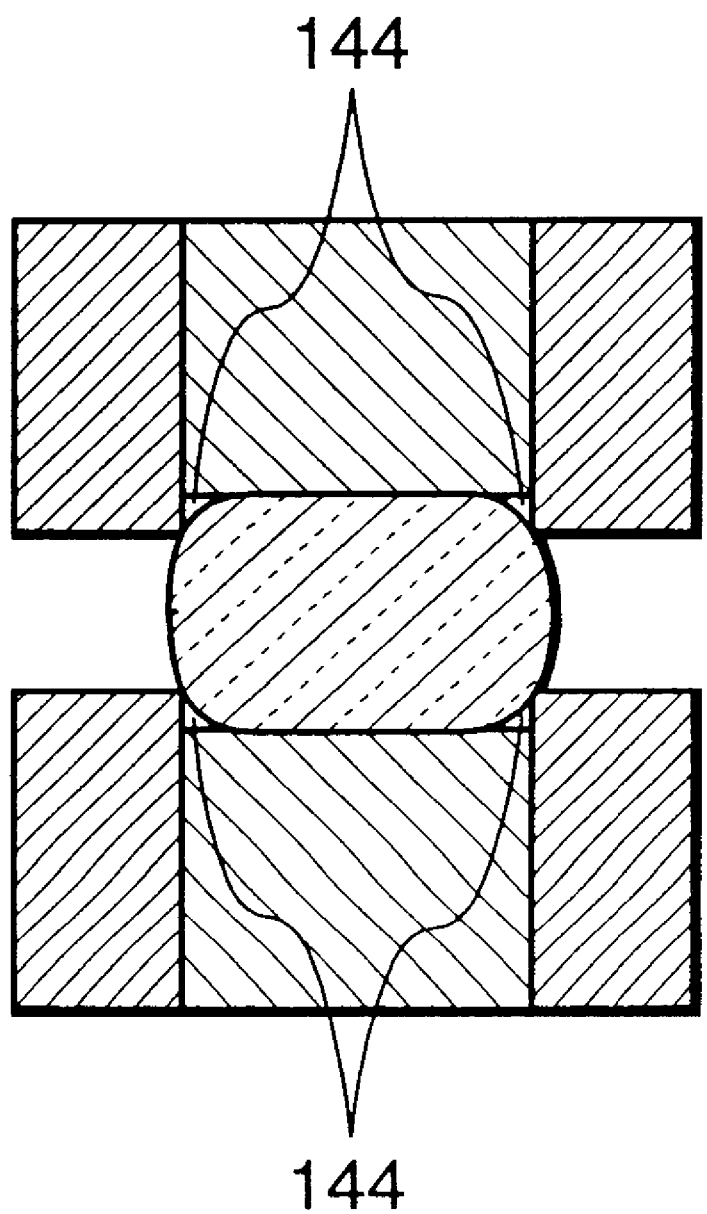
FIG. 26 is a sectional view taken along a section 140 of FIG. 24.
Figure 27:
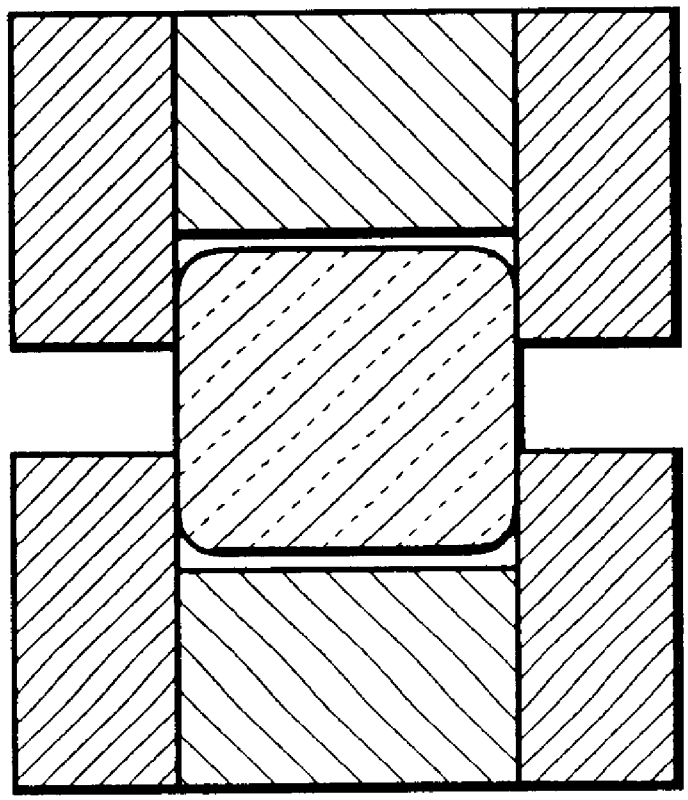
FIG. 27 is a sectional view taken along a section 141 of FIG. 24.

As shown in FIG. 22, a glass material 139 is loaded in the mold, and is heated to a required temperature and softened. As shown in FIG. 23, the upper mold 134 is moved downward to sandwich the glass material 139 together with the lower mold 135 (portions 142 of the glass material 139 are in contact with the upper and lower molds 134 and 135). Successively, the upper mold 134 is moved downward to apply a press pressure to the glass material 139 (see FIG. 24). In this case, on sections 140 and 141, as shown in FIGS. 26 and 27, the corners of the portions of the mold (portions on the section 140) subjected to press deformation are already filled with the glass material, and the excessive glass material begins to swell out horizontally from portions of the upper and lower periphery regulating members 136 and 137 exceeding regulating surfaces 144. Since the distance between the regulating surfaces 144 on the section 140 is large, the swell-out amount in the horizontal direction is small for the progress of pressing.

Figure 25:
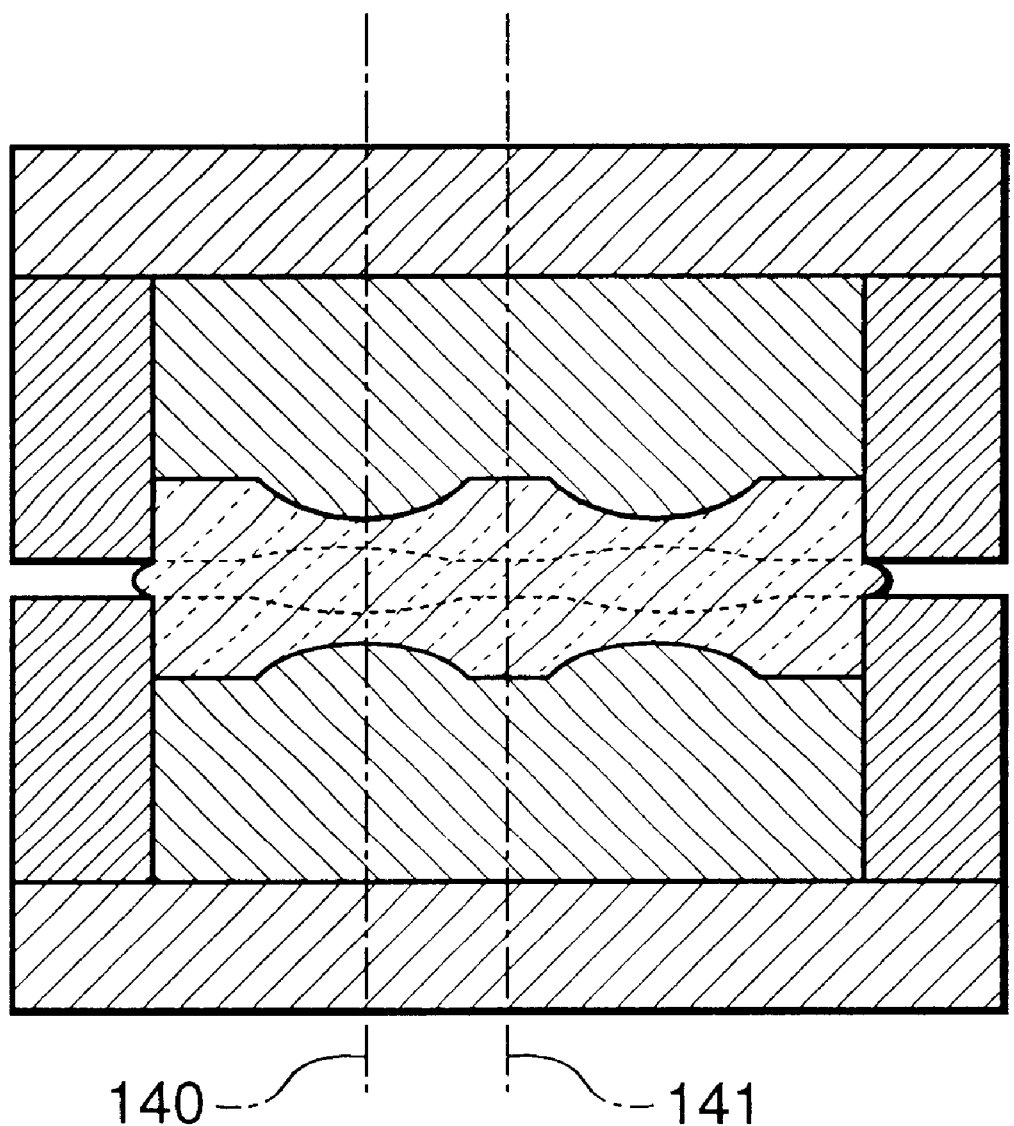
FIG. 25 is a sectional view showing the arrangement of the mold to indicate the press process (final stage) during molding in the second embodiment of the present invention.
Figure 28:
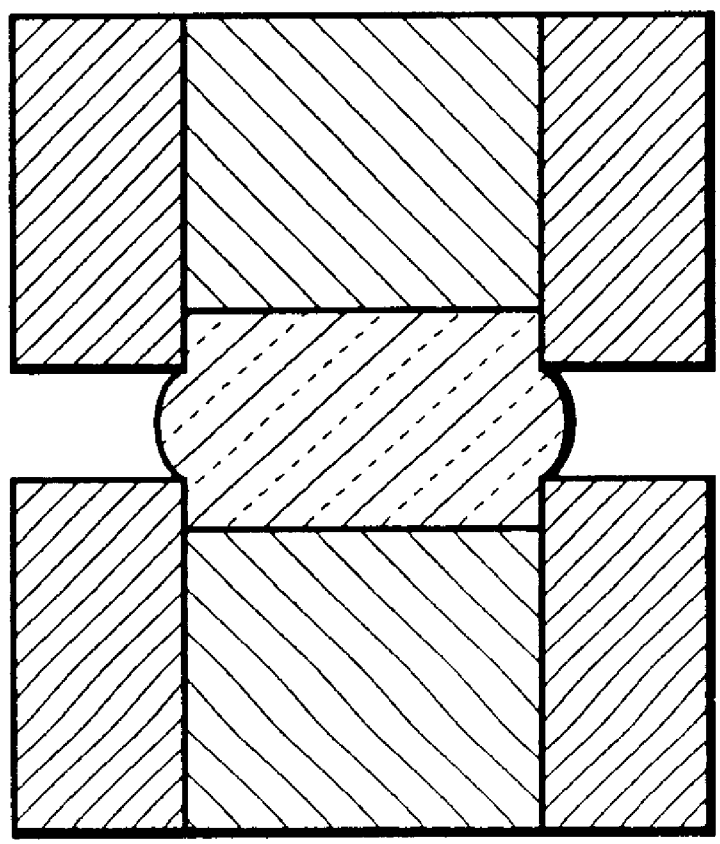
FIG. 28 is a sectional view taken along a section 140 of FIG. 25.
Figure 29:
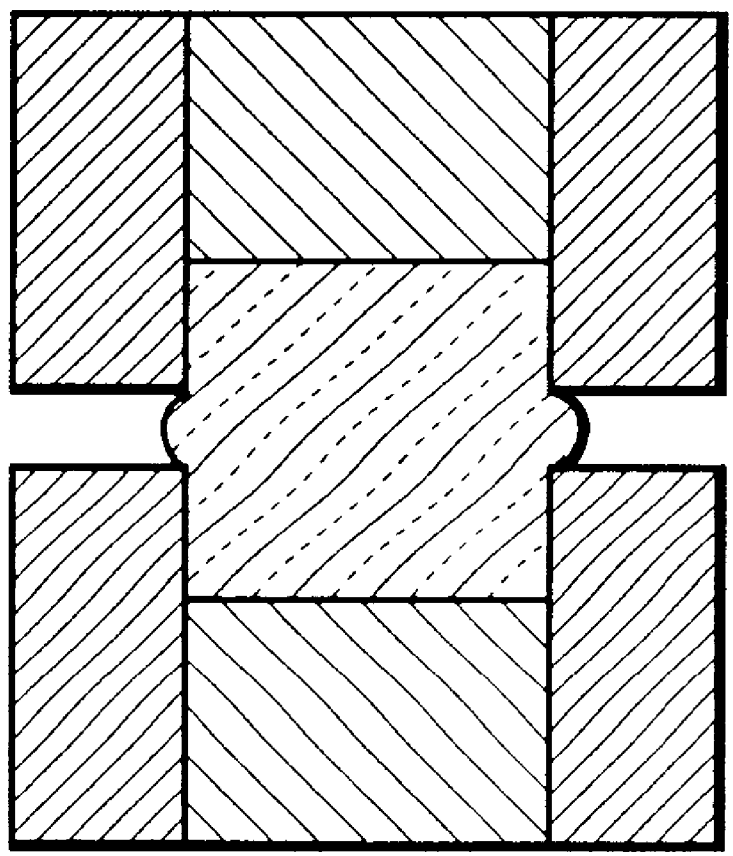
FIG. 29 is a sectional view taken along a section 141 of FIG. 25.
Figure 31:
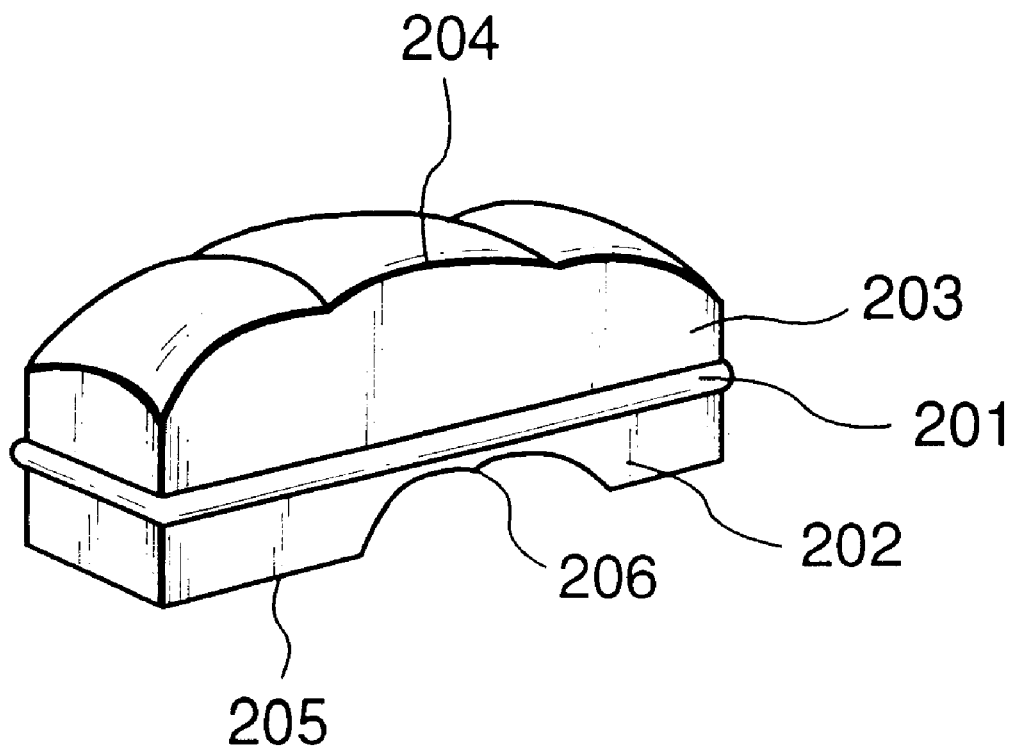
FIG. 31 is a perspective view of a conventional glass-molded lens for comparison with the third embodiment.

When press molding further progresses and the upper and lower molds 134 and 135 press the glass material 139 to a predetermined thickness (see FIG. 25; portions 143 in FIG. 23 are also in contact with the molds 134 and 135 to receive the press pressure). In this case, the sections 140 and 141 are as shown in FIGS. 28 and 29, and the glass material swells out in accordance with the press deformation amount. Where the press deformation amount is large, the glass material swells out early, and where the press deformation amount is small, swelling out of the glass material is late. The swell-out speed in the horizontal direction is low in the former portions and high in the latter portions. Also, the distance between the periphery regulating members 136 and 137 (the thickness of the swell-out portion) corresponds to the press deformation amount. Therefore, the swell-out amounts in the horizontal direction along the edges of the molding surfaces become finally uniform at the respective portions. At this time point, the corners of the molds are almost completely filled the glass material at any portion at the edges of the molding surfaces (e.g., portions on the sections 140 and 141).

The amount of excessive glass material to fill the gap depends on the volume and shape of the glass material and may be determined by adjusting the height of the glass material. An effect can be obtained even by roughly changing the thickness of the excess alone along the edges of the molding surfaces, as in this embodiment.

In this manner, when the mold according to this embodiment is used, the molded optical element has a good glass-filled degree at any portion in its corners, and good optical elements free from cracking or cutout can be continuously molded. If the mold has a complicated shape and accordingly has a portion which cannot be easily filled with the glass material, the distance corresponding to the excessive swell-out portion may be narrowed regardless of the deformation amount of the glass, so that glass can fill even the complicated portions.

Assume that a mold in which the gap corresponding to the excessive glass material is constant, as in the conventional mold, is used. During transition from the state shown in FIG. 24 to the state shown in FIG. 25, the glass material must swell out into a gap having a constant distance both at the portion 140 having a large press deformation amount (push-in amount) of the glass material and the portion 141 having a small deformation amount. The internal pressure becomes accordingly larger in the portion 140 than in the portion 141, and stress increases at the corners of the mold to likely form a crack or cutout.

In this embodiment, it can be estimated considerably easily as to how to deform the glass material so it comes into contact with the molding surfaces of the molds. When the glass material is to be press-molded by using a mold having somewhat more complicated shape, it is difficult to predict the deformation amount and direction of the glass material since the factors of both the shape of the glass material and the shape of the mold are associated with them in a complicated manner.

Therefore, assume that a mold is formed to have a shape with which the vertical thickness of the excessive portion is constant, as in the conventional mold, and press molding is performed once with this mold. The obtained molded product is observed to check which portions of the mold are completely filled to its corners. On the basis of this data, the shape of the mold corresponding to the excess in the direction of thickness is gradually changed. Namely, the distance between the ends of the periphery regulating members is set large or small, so the thickness of the excess (swell-out portion) becomes large at a portion close to where the glass material completely fills even the corners of the mold, and small so the thickness of the excess (swell-out portion) becomes small at a portion close to where the glass material does not fill a portion necessary for the optical functional surface of the molded product, thereby obtaining an optical glass element having a uniform glass filling degree.

(Third Embodiment)

The third embodiment of the present invention will be described in detail with reference to FIGS. 30 to 35.

Figure 32:
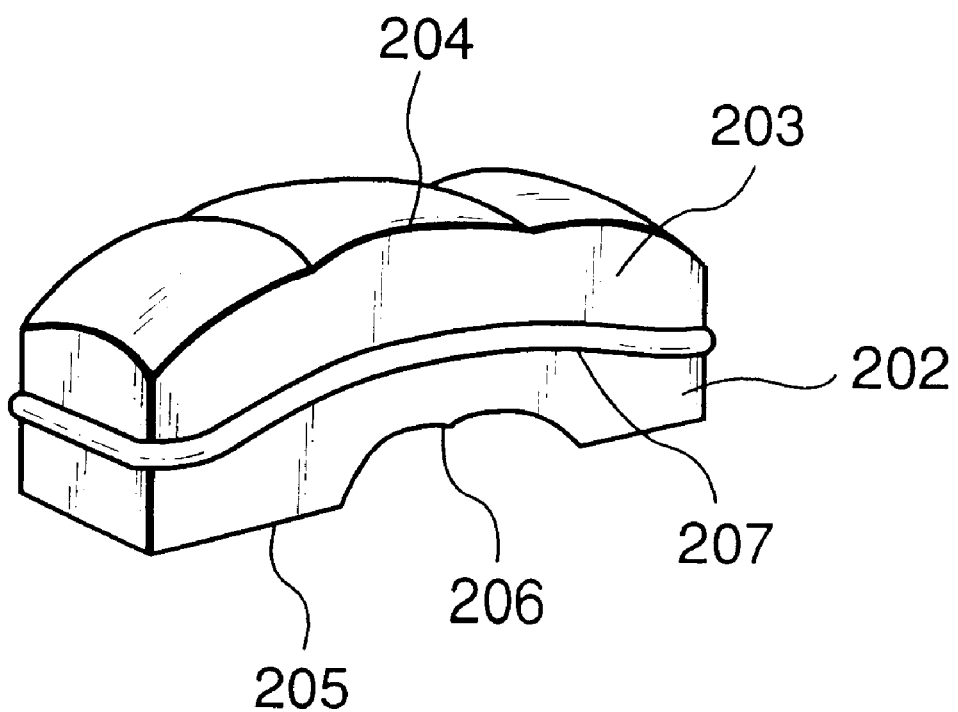
FIG. 32 is a perspective view of a glass-molded lens according to the third embodiment.
Figure 33:
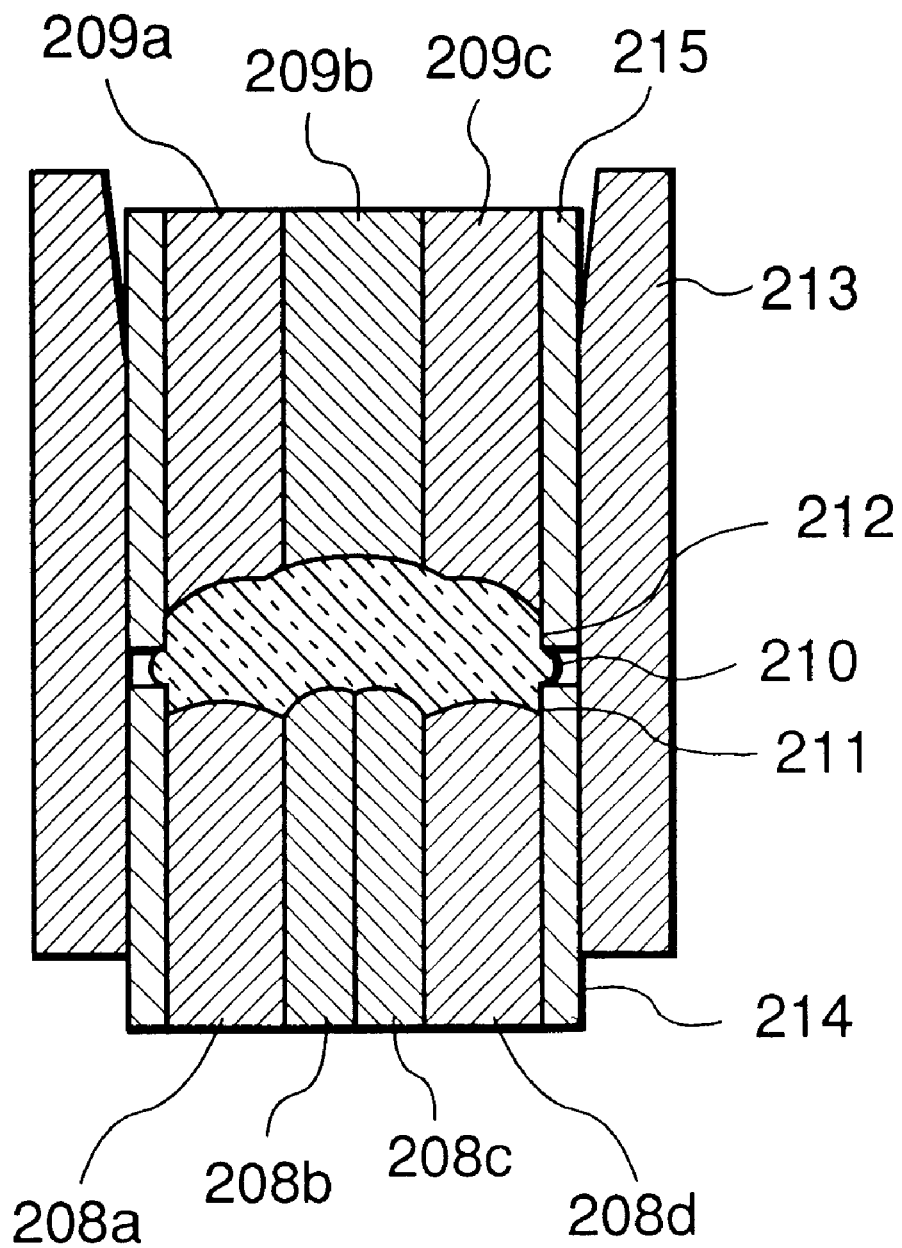
FIG. 33 is a sectional view showing the arrangement of a mold according to the third embodiment.
Figure 34:
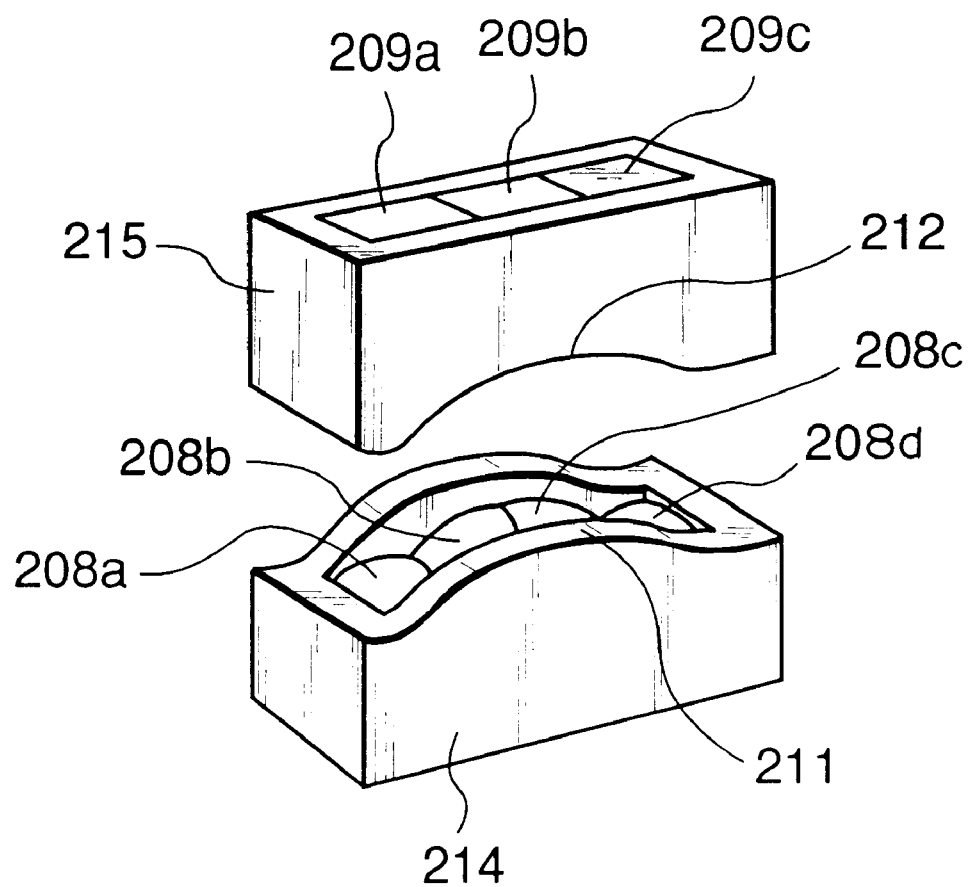
FIG. 34 is a perspective view of the mold according to the third embodiment.

FIG. 30 is a schematic diagram showing a reflecting optical system according to the third embodiment. A light beam incident on an optical element through R1 is reflected within the optical element at R2 to R6, and emerges from R7. This optical element is constituted by spherical surfaces R1 and R7 and free curved surfaces R2 to R6. A mold for glass molding according to this embodiment has an arrangement as shown in FIG. 33. FIGS. 34 and 32 are perspective views respectively showing a mold according to the present invention and an optical element (glass lens) as a product molded with this mold.

This molding apparatus has a lower mold 208, a lower periphery regulating member 214, an upper mold 209, and an upper periphery regulating member 215. The lower mold 208 has one molding surface on its upper surface. The lower periphery regulating member 214 fits on the outer surface of the lower mold 208 and regulates an excess of a glass material swelling outward from the molding surface of the lower mold 208. The upper mold 209 has the other molding surface on its lower surface. The upper periphery regulating member 215 fits on the outer surface of the upper mold 209 and regulates the excess of the glass material swelling outward from the molding surface of the upper mold 209. When at least one of the upper and lower molds 209 and 208 is moved vertically to press-mold the thermally softened glass material with the molding surfaces, an excess 210 of the glass material flows into a space formed by upper and lower ends 211 and 212 of the lower and upper periphery regulating members 214 and 215, respectively. The positions of the upper and lower ends 211 and 212 of the space where the excess of the glass material flows into change vertically in accordance with the shapes of the end portions of the two molding surfaces (see FIG. 34).

Referring to FIGS. 33 and 34, reference numerals 208a, 208b, 208c, and 208d denote the mold members of the lower mold 208 that partially constitute the respective discontinuous flat portions of the molding surface as they are divided into four portions; and 209a, 209b, and 209c, the mold members of the upper mold 209 that partially constitute the respective discontinuous flat portions of the molding surface as they are divided into three portions. The upper periphery regulating member 215 regulates the edge of the upper molding surface (this serves as the frame mounting reference surface of a molded optical element to be described later). The lower periphery regulating member 214 regulates the edge of the lower molding surface.

The upper and lower periphery regulating members 215 and 214 are slidably arranged on the inner wall of a cylindrical mold 213.

How to mold a glass lens as a reflecting optical element by using the mold for glass molding having the above arrangement will be described.

A glass material (gob) is placed between the upper and lower molds 209 and 208. The entire mold is heated to indirectly soften, by heating, the glass material to a required temperature. When the glass material is softened at a predetermined temperature, the lower mold 208 and lower periphery regulating member 214 are fixed. The upper mold 209 and upper periphery regulating member 215 are integrally moved downward to press the glass material to a height corresponding to a predetermined thickness of the optical element to be molded, thereby performing press molding.

A space for receiving the swell-out portion 210 of the glass material is present between the lower end 212 of the upper periphery regulating member 215 and the upper end 211 of the lower periphery regulating member 214. Excessive glass flows into this space to form a molded product having a constant thickness without being affected by variations in volume of the glass gob.

In this embodiment, the shape of the gap into which the glass material swells out is designed and machined in the following manner. Namely, as shown in FIG. 32, the gap must be as far as possible from both a portion where the peripheral portions of the mold members 209a, 209b, 209c, and 209d of the upper mold 209 come into contact with the upper periphery regulating member 215, i.e., a portion corresponding to one optical functional surface 204 of the optical element, and a portion where the peripheral portions of the mold members 208a, 208b, 208c, and 208d of the lower mold 208 come into contact with the lower periphery regulating member 214, i.e., a portion corresponding to the other optical functional surface 205 of the optical element. Also, the gap must be constituted by continuation of arcs and straight lines that continuously change in the vertical direction (see FIG. 35).

The entire mold is cooled down. When the mold reaches a predetermined temperature, it is opened, and the molded optical element (glass lens) is extracted. In the product molded with this mold, as shown in FIG. 32, its swell-out portion 207 is as far as possible from the upper and lower optical functional surfaces at any portion of the edges of the optical functional surfaces of the optical element. Hence, an adverse influence on the optical functional surfaces, such as degradation in planar precision at a position close to the glass swell-out portion of the optical element, can be minimized.

As described above, according to this embodiment, an optical element such as a glass-molded lens, which has positioning reference surfaces, a high lens thickness precision, and a high planar precision can be obtained easily with a simple mold arrangement.

An optical element molded according to this embodiment will be described in detail with reference to FIG. 35.

In this embodiment, the upper surface of the swell-out portion of the optical element forms a curved shape 219 transferred from the shape of the lower end face of the upper periphery regulating member of the mold, and the lower surface thereof forms a curved shape 220 transferred from the shape of the upper end face of the lower periphery regulating member of the mold. Each of the curved shapes 219 and 220 is constituted by a combination of arcs and straight lines and changes in the vertical direction (in FIG. 35, continuation of regions 216a to 216e, and 218a to 218e; i.e., reference numerals 216a, 216e, 218a, and 218e denote straight portions, and 216b, 216c, 216d, 218b, 218c, and 218d, arcuate portions). The curved shapes 219 and 220 are formed to be as far as possible from the corresponding optical functional surfaces.

Although these shapes may be formed by designing the lower end face of the upper periphery regulating member 215 and the upper end face of the lower periphery regulating member 214 by employing spline curves and free curves, it makes design and machining cumbersome, and takes time, leading to an increase in cost. If, however, the combination of arcs and straight lines is employed, designing of the lower end face of the upper periphery regulating member 215 and the upper end face of the lower periphery regulating member 214 can be simplified, and the mold machining apparatus can be controlled easily. The completed figure forms a continuously, smoothly changing curve having no vertically discontinuous portion. Hence, a crack or cutout is not formed easily in this curved portion of the optical element.

Figure 36:
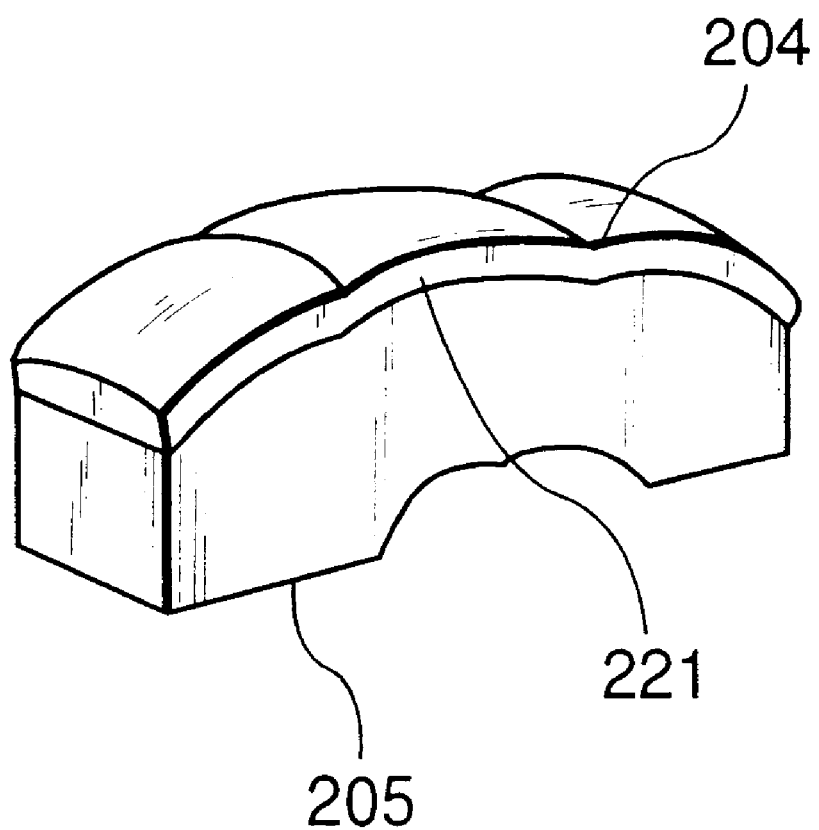
FIG. 36 is a perspective view of a glass-molded lens according to a modification.

The excessive glass swell-out portion may be set at the same position as the molding surface, as shown in FIG. 36. However, this adversely affects the precision of the molding surface. If the molding surface has a complicated shape, machining of the lower periphery regulating member becomes complicated to increase the cost.

(Fourth Embodiment)

Figure 37:
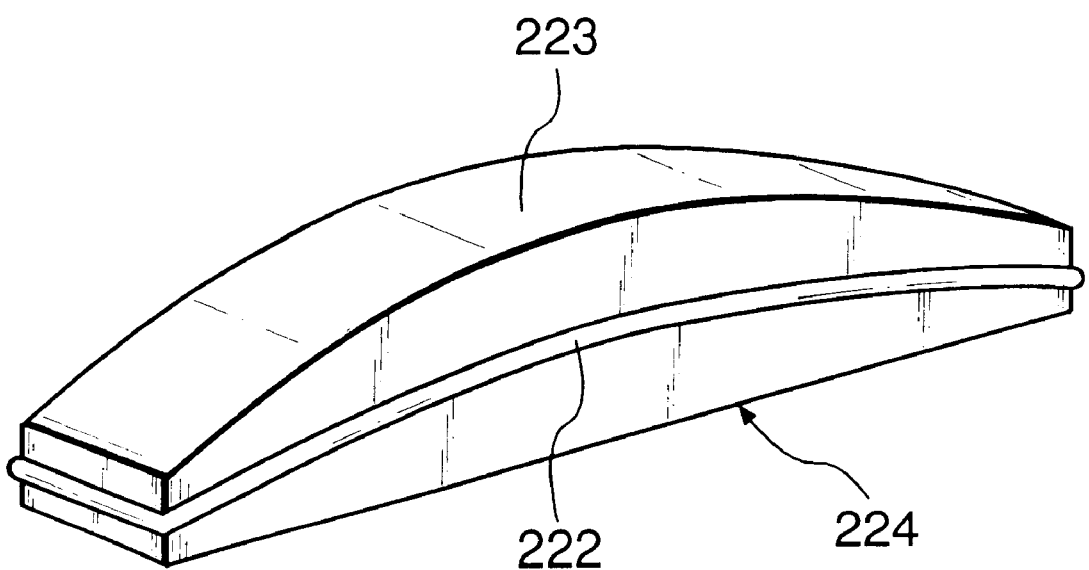
FIG. 37 is a perspective view of a glass-molded lens according to the fourth embodiment.

In molding an f-θ lens shown in FIG. 37 used in a laser beam printer and the like, when the excessive glass swell-out portion is vertically curved in the same manner as in the first and third embodiments, a good molding result can be obtained.

Figure 38:
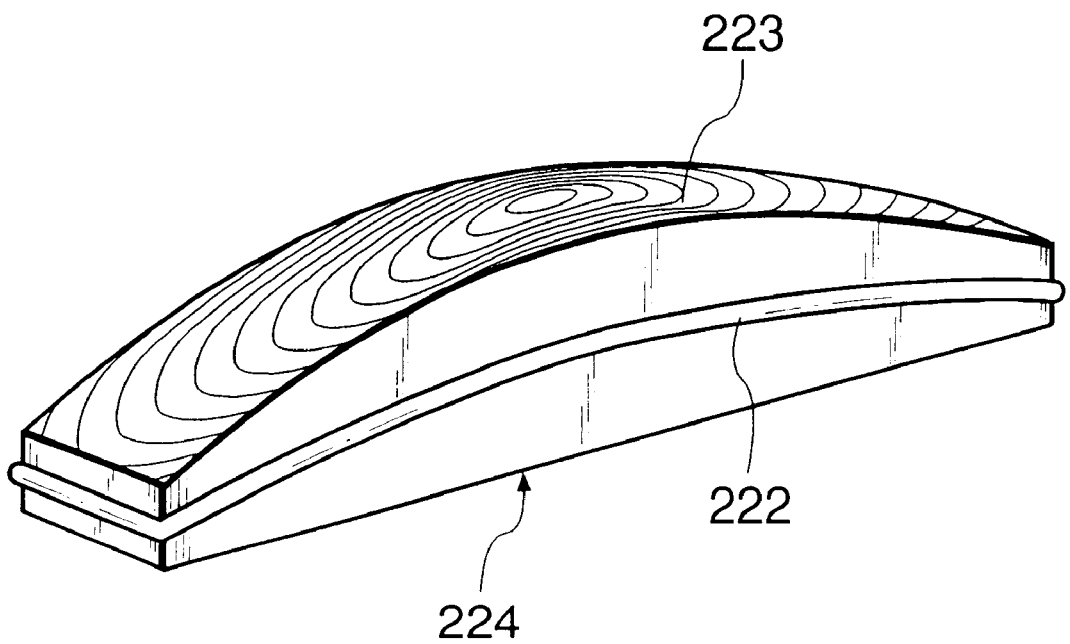
FIG. 38 shows a lens having a diffraction grating on its lens surface.

In molding a lens shown in FIG. 38 having a diffraction grating on its lens surface, a good result can be similarly obtained.

As has been described above, according to the present invention, the periphery regulating members are arranged around the upper and lower molds to form positional references necessary for incorporating the optical element. Since a laterally swell-out portion is formed on the optical element, an error in thickness of the molded product caused by variations in volume of the glass material can be decreased. The vertical position of the swell-out portion is changed in accordance with the shapes of the molding surfaces of the upper and lower molds so it is as far as possible from the optical functional surfaces of the molded product. By these means, an influence of the swell-out portion on the optical functional surfaces of the molded product can be minimized, so that a good optical element such as a lens can be obtained.

According to the present invention, in the mold for press-molding a thermally softened glass material, the thicknesses in the vertical (pressing) direction are intentionally made nonuniform, at portions where the excessive glass material swells out, to adjust the pressure acting on the glass during pressing. Hence, the glass material deforms upon pressing to equally fill any portion of the corners of the mold. In fine, it is also possible not to allow glass to completely fill even the corners of the mold so the glass is molded with a few non-contact portions left. Then, cracking and cutout at the corners of the molded product can be prevented, and glass fragments are eliminated, thereby decreasing the number of times of cleaning the mold.

The present invention is not limited to the above embodiments and various changes and modifications can be made within the spirit and scope of the present invention. Therefore, to apprise the public of the scope of the present invention the following claims are made.

What is claimed is:

1. A molding apparatus for molding a non axially symmetric optical element by pressing a glass material softened by heat with an upper mold and a lower mold, said apparatus comprising:

a lower mold having a molding surface on an upper surface thereof for molding one surface of the non axially symmetric optical element;

a lower periphery regulating member fitting on an outer surface of said lower mold to regulate an excess of the glass material swelling outward from said molding surface of said lower mold;

an upper mold having a molding surface on a lower surface thereof for molding another surface of the non axially symmetric optical element; and an upper periphery regulating member fitting on an outer surface of said upper mold to regulate the excess of the glass material swelling outward from said molding surface of said upper mold, wherein at least one of said molding surfaces of said lower and upper molds is formed in a non axially symmetric shape, wherein said lower and upper periphery regulating members each include upper and lower ends formed of combinations of arcs or arcs and straight lines that are continuous along edges of said molding surfaces, and wherein the excess of the glass material swelling outward from said molding surfaces, which is regulated by said upper and lower ends of said lower and upper periphery regulating members, is formed at an approximate center between said molding surfaces of said lower and upper molds.

2. An optical element molded from a molding apparatus for thermally softening a glass material and pressing the glass material with upper and lower molds, and having a space into which an excess of the glass material flows around molding surfaces of the upper and lower molds, wherein a projection portion is formed by the space into which the excess of the glass flows at an approximate center between molding surfaces of the upper and lower molds, wherein the projection portion is formed of combinations of arcs and straight lines that are continuous, and wherein the optical element is a non-axially symmetric optical element.

* * * * *

UNITED STATES PATENT AND TRADEMARK OFFICE
CERTIFICATE OF CORRECTION

PATENT NO. : 6,295,172 B1  
DATED : September 25, 2001  
INVENTOR(S) : Nobuhiro Yamamichi et al.

It is certified that error appears in the above-identified patent and that said Letters Patent is hereby corrected as shown below:

<u>Title page,</u>  
Item [56], References Cited, FOREIGN PATENT DOCUMENTS, "63-10100" should read -- 61-10100 --, "2-157130" should read -- 1-157130 --, and the following should be inserted: -- 61-10034   *   1/1986     (JP). --

<u>Column 1,</u>  
Line 18, "relatively come" should read -- to come relatively --.

<u>Column 4,</u>  
Line 17, "an lens" should read -- a lens --.

<u>Column 5,</u>  
Line 26, "hereof," should read -- thereof, --.

<u>Column 13,</u>  
Line 39, "In fine, it" should read -- It --.

<u>Column 14,</u>  
Line 2, "non axially" should read -- non-axially --;  
Line 7, "non" should read -- non- --; and  
Line 14, "non" should read -- non- --; and  
Line 21, "non axially" should read -- non-axially --.

Signed and Sealed this

Twenty-seventh Day of August, 2002

*Attest:*

JAMES E. ROGAN  
*Director of the United States Patent and Trademark Office*

*Attesting Officer*

UNITED STATES PATENT AND TRADEMARK OFFICE
CERTIFICATE OF CORRECTION

PATENT NO.     : 6,295,172 B1                                      Page 1 of 1
DATED          : September 25, 2001
INVENTOR(S)    : Nobuhiro Yamamichi et al.

It is certified that error appears in the above-identified patent and that said Letters Patent is hereby corrected as shown below:

<u>Title page,</u>
Item [56], References Cited, FOREIGN PATENT DOCUMENTS, the following should be inserted: -- 61-10034   *   1/1986    (JP). --

<u>Column 1,</u>
Line 18, "relatively come" should read -- to come relatively --.

<u>Column 4,</u>
Line 17, "an lens" should read -- a lens --.

<u>Column 5,</u>
Line 26, "hereof," should read -- thereof, --.

<u>Column 13,</u>
Line 39, "In fine, it" should read -- It --.

<u>Column 14,</u>
Line 2, "non axially" should read -- non-axially --;
Line 7, "non" should read -- non- --; and
Line 14, "non" should read -- non- --; and
Line 21, "non axially" should read -- non-axially --.

This certificate supersedes Certificate of Correction issued August 27, 2002.

Signed and Sealed this

Twentieth Day of January, 2004

JON W. DUDAS
*Acting Director of the United States Patent and Trademark Office*